United States Patent [19]

Sawamura et al.

[11] Patent Number: 5,289,383
[45] Date of Patent: Feb. 22, 1994

[54] METHOD FOR ESTABLISHING DATA DEFINING TOOL PATH FOR ROUGH MACHINING

[75] Inventors: Jun Sawamura, Kanagawa; Tetsuzo Kuragano, Tokyo, both of Japan

[73] Assignee: Sony Corporation, Tokyo, Japan

[21] Appl. No.: 26,259

[22] Filed: Mar. 4, 1993

Related U.S. Application Data

[63] Continuation of Ser. No. 703,474, May 17, 1991, abandoned.

[30] Foreign Application Priority Data

May 17, 1990 [JP] Japan .................. 2-127172

[51] Int. Cl.$^5$ .................. G06F 15/46; G05B 19/18
[52] U.S. Cl. .................. 364/474.29; 318/570
[58] Field of Search .................. 364/474.28, 474.29, 364/191; 318/569, 570

[56] References Cited

U.S. PATENT DOCUMENTS

| | | | |
|---|---|---|---|
| 4,584,649 | 4/1986 | Komanouri et al. | 364/191 |
| 4,789,931 | 12/1988 | Kuragano et al. | 364/474.18 |
| 4,819,192 | 4/1989 | Kuragano et al. | 395/121 |
| 4,866,631 | 9/1989 | Kuragano et al. | 364/474.29 |
| 4,905,158 | 2/1990 | Seki et al. | 364/474.29 |

FOREIGN PATENT DOCUMENTS 0161321  11/1985  European Pat. Off. .
0258897  3/1988  European Pat. Off. .

Primary Examiner—Jerry Smith
Assistant Examiner—Paul Gordon
Attorney, Agent, or Firm—Limbach & Limbach

[57] ABSTRACT

In a method for generating data defining the machining depth along a tool path, grid points are generated according to split points indicating a form of a model, and rough machining data for contour milling is generated according to the grid points, so that rough machining data which presents overcutting can be prepared. Contour points are generated and drilling points are set according to a comparison with cut planes so that the drilling points can be set easily and automatically. The contour points are retrieved successively so as to easily generate a tool path for contour milling.

8 Claims, 23 Drawing Sheets

METHOD FOR ESTABLISHING DATA DEFINING TOOL PATH FOR ROUGH MACHINING

This is a continuation of co-pending application Ser. No. 07/703,474 filed on May 17, 1991 and now abandoned.

BACKGROUND OF THE INVENTION

FIELD OF THE INVENTION

The present invention relates generally to a method for generating offset surface data. More particularly, the invention relates to a method for generating offset surface data particularly applicable in designing and manufacturing of contoured products utilizing data representing a free surface generated through computer aided design (CAD) and/or computer aided manufacturing (CAM) for example.

DESCRIPTION OF THE BACKGROUND ART

In the case where the contour of an object defined by a free surface is designed using CAD technique (so called, geometric modeling), the designer generally specifies a plurality of points (articulation points) in a three dimensional coordinate system through which the surface is to pass and uses a computer to calculate a boundary line network interconnecting the plurality of specific articulated points on the basis of desired vector functions. A surface represented by a "wire frame" is thus generated. In this way, a multiple number of frame spaces enclosed with boundary lines can be formed. The above-mentioned frame processing represents a rough sketch to be designed by the designer. If a surface which can be represented by predetermined vector functions using boundary lines enclosing each frame space can be interpolated, the free surface desired by the designer (which is impossible to specify by means of a quadratic function) can, as a whole, be generated.

The surface extended over each framed space forms a basic element constituting the whole surface and is called a "patch".

To provide a more natural outer contour for the entire generated free surface, a free surface generating method has been proposed in which a control side vector around a common boundary is set again so as to extend a patch to satisfy the condition of continuity of the osculating planes at the common boundary bridging the two frame spaces.

U. S. Pat. No. 4,819,192 exemplifies the above-mentioned free surface generating method. The free surface generating method disclosed in the aforementioned United States Patent will be described with reference to FIGS. 1 and 2.

In the case where two patches S(u, v)1 and S(u, v)2 (denoted by vectors) are smoothly connected to each other, e.g., as shown in FIG. 1, control side vectors a1, a2, c1 and c2 so as to establish continuity of the osculating plates are, in principle, set on a common boundary COM 12 bridging adjoining patches S(u, v)1 and S(u, v)2 on the basis of articulated points P(00), P(30)1, p(33)1, p(03), P(33)2 and P(30)2 derived through the frame processing internal control points P(11)1, P(12)1, P(11)2 and P(12)2 which are set once again by means of these control side vectors.

If the above-described technique is applied to other common boundaries, the two patches S(u, v)1 and S(u, v)2 can be smoothly connected to other adjoining patches to provide continuity of the osculating planes.

It is noted that an "osculating plane" is a plane formed by tangent vectors in the u and v directions at each point of the common boundary. For example, when at each point on the common boundary COM 12 of FIG. 1, the osculating planes of the patches S(u, v)1 and S(u, v)2 are the same, continuity of the "osculating planes" is established.

In detail, the condition of continuity of the osculating planes at a point (o, v), wherein u=o and v=v, on the common boundary COM 12, is determined as shown in FIG. 2. That is, for the patch S(u, v)1 a normal vector n1 for a tangent vector Ha in a direction traversing the common boundary COM 12 (i.e., u direction) and a tangent vector Hb in a direction along the common boundary COM 12 (i.e., v direction) can be expressed in the following equation:

$$n1 = Ha * Hb \quad (1)$$

In addition, for the other patch S(u, v)2 a normal vector n2 for a tangent vector Hc in a direction traversing the common boundary COM 12 and a tangent vector Hb in a direction along the common boundary COM 12 can be expressed in the following equation:

$$n2 = Hb * Hc \quad (2)$$

Since the two sets of tangent vectors Ha, Hb and Hc must be present on the same plane, respectively, to establish the condition of continuity of the osculating planes under such a condition as described above, the two normal vectors n1 and n2 are consequently in the same direction.

To achieve this condition for the two normal vectors n1 and n2, the internal control points P(11)1, P(21)1, P(12)1 p(22)1 and P(11)2, P(21)2, p(12)2, p(22)2 may be set so as to establish the following equation:

$$\lambda(v) \cdot \frac{\delta S(u, v)^2}{\delta u} = \mu(v) \cdot \mu \frac{\delta S(u, v)^2}{\delta u} + \gamma(v) \cdot \frac{\delta S(u, v)^1}{\delta v} \quad (3)$$

In the equation (3), $\lambda(v)$, $\mu(v)$ and $\gamma(v)$ denote scalars.

Furthermore, the patches S(u, v)1 and S(u, v)2 are represented using a vector function S(u, v) of a cubic Bezier equation:

$$S(u, v) = (1-u+uE)^3 \cdot (1-v+vF)^3 \cdot P(00) \quad (4)$$

It is noted that u and v denote parameters in the u direction and the v direction and E and F denote shift operators, as follows.

In the realm of practical application of this theory, i.e. describing the path to be followed by a milling tool, it is thought to be advantageous if a metallic mold of a product can be prepared automatically by driving, for example, a numerically controlled (NC) milling machine according to the form data thus generated.

Also, furthermore, if the time required for rough machining a metallic mold can be shortened then the whole manufacturing process can be shortened accordingly.

FIG. 3 illustrates a method wherein data of a tool path for contour milling, which is one of the techniques for rough machining, is prepared according to the form data, and a metallic mold 1 is prepared according to the data of a tool path.

Here, the contour milling is a process for cutting an outline form of a metallic mold by successively changing the position in the direction Z, for example, of an end mill 2 in sequence while focussing an outline form of the product, which is suitable to an unattended rough machining.

However, in a prior art generating method for a tool path data for contour milling, in some situations, e.g. when machining the complicated metallic mold of a three-dimensional form, tool interference is unavoidable and a metallic mold is overcut.

Further as shown in FIG. 4, in a metallic mold 4 having a recession (hereinafter called a pocket portion) 3, the pocket portion 3 must be drilled beforehand for inserting an end mill therein, and thus an operator must prepare control data separately for drilling.

Particularly in the metallic mold of a three-dimensional dimensional form, the bottom of a pocket portion may have complex variation height, and in such case an operator must determine a sectional form of the pocket portion before preparing control data for drilling so as not to cause overcutting.

Here, u and v are comprised of parameters in the directions u and v respectively, and are related by the following equations:

$$E \cdot P(i, j) = P(i + 1, j) \quad (5)$$
$$(i, j = 0, 1, 2)$$

$$E \cdot P(i, j) = P(i, j + 1) \quad (6)$$
$$(i, j = 0, 1, 2)$$

$$0 \leq u \leq 1 \quad (7)$$

$$0 \leq v \leq 1 \quad (8)$$

by means of shift operators E and F with reference to the node P(00) as a control point.

Thus, by setting control points P(01), P(02), p(10)1 to P(13)1 P(20)1 to P(23)1, p(31)1, p(32)1 and p(10)2 to p(13)2, P(20)2 to p(23)2, P(31)2, P(32)2 in a space surrounded by six nodes P(00), P(03), P(33)1, P(30)1, P(33)2 and P(30)2, curved patches S(u, v)1 and S(u, v)2 each passing through four nodes p(00), p(03), P(33)1, p(30)1 and p(00), p(03), p(33)2, p(30)2 respectively and determined by control points P(01) to p(32)1 and P(01) to P(32)2 each can be generated.

Further, by resetting internal control points P(11)1, P(12)1 and P(11)2, P(12)2 and interposing common control points P(01), P(02) therebetween in a tangent plane continuous condition, the patches S(u, v)1 and S(u, v)2 can be connected, smoothly.

Accordingly, bu generating the patches sequentially through adjacent nodes with reference to the nodes input by the designer and reconnecting the patches thus generated, a free curved surface which changes smoothly as a whole can be generated.

Thus, even when a complicated form is designed, a form changing smoothly as a whole can be generated as intended by the designer.

SUMMARY OF THE INVENTION

In view of the foregoing, an object of the present invention is to provide a method for generating rough machining data for contour milling which is effective in preventing overcutting during the rough machining of metallic molds.

The foregoing object and other objects of the invention have been achieved by the provision of a method for generating data defining the machining depth along a tool path for a numerically controlled machine of the type having a machining tool of a known configuration using form data defining a three-dimensionally curved surface, comprising the steps of:

forming a plurality of split points which indicate roughly a three-dimensionally curved surface according to the form data, forming a plurality of split points indicating the form roughly according to the form data, forming a plurality of the grid points continuing in the directions X and Y at a predetermined pitch and having a Z coordinate value of a tool center of the end mill to prevent an overcutting according to the split points and a tool radius of the end mill, and generating the rough machining data for contour milling by comparing the Z coordinate value of cut planes and the Z coordinate values of the grid points.

Further, a second aspect of the invention is characterized in that, with respect to the plurality of contour points indicating a contour of the form cut by the cut planes which are generated according to the result obtained from comparing the Z coordinate value of the cut planes and the Z coordinate value of the grid points, the contour points ready for contour milling from around the machining target are detected sequentially according to the grid points. One of the contour points remaining at the time of detection of the contour points is set at a drilling position and the rough machining data for contour milling is generated with the drilling position as a start point according to the remaining contour points.

Still further, moving paths connecting the contour points sequentially are generated according to the detection result and rough machining data for contour milling indicating the moving paths is generated.

By generating rough machining data for contour milling according to a result obtained from comparing the Z coordinate value of the cut planes and the Z coordinate value of the grid points, machining data for contour milling which is effective in preventing an overcutting during rough machining may be obtained.

Further, a plurality of contour points indicating a contour of the form cut by the cut planes are generated, one of the contour points remaining after detection of the contour points ready for contour milling from around the machining target is set at the drilling position, rough machining data for the remaining contour milling is generated with the drilling position as a start point, and thus the drilling position can automatically be selected, and the machining data for contour milling can be easily generated.

Further, the contour points ready for contour milling from around the machining target are detected sequentially, and the moving paths connecting the contour points are successively generated, thereby generating the machining data for contour milling easily.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of the present invention will be described with reference to the accompanying drawings:

(1) General construction of CAD/CAM system

Figure 5:
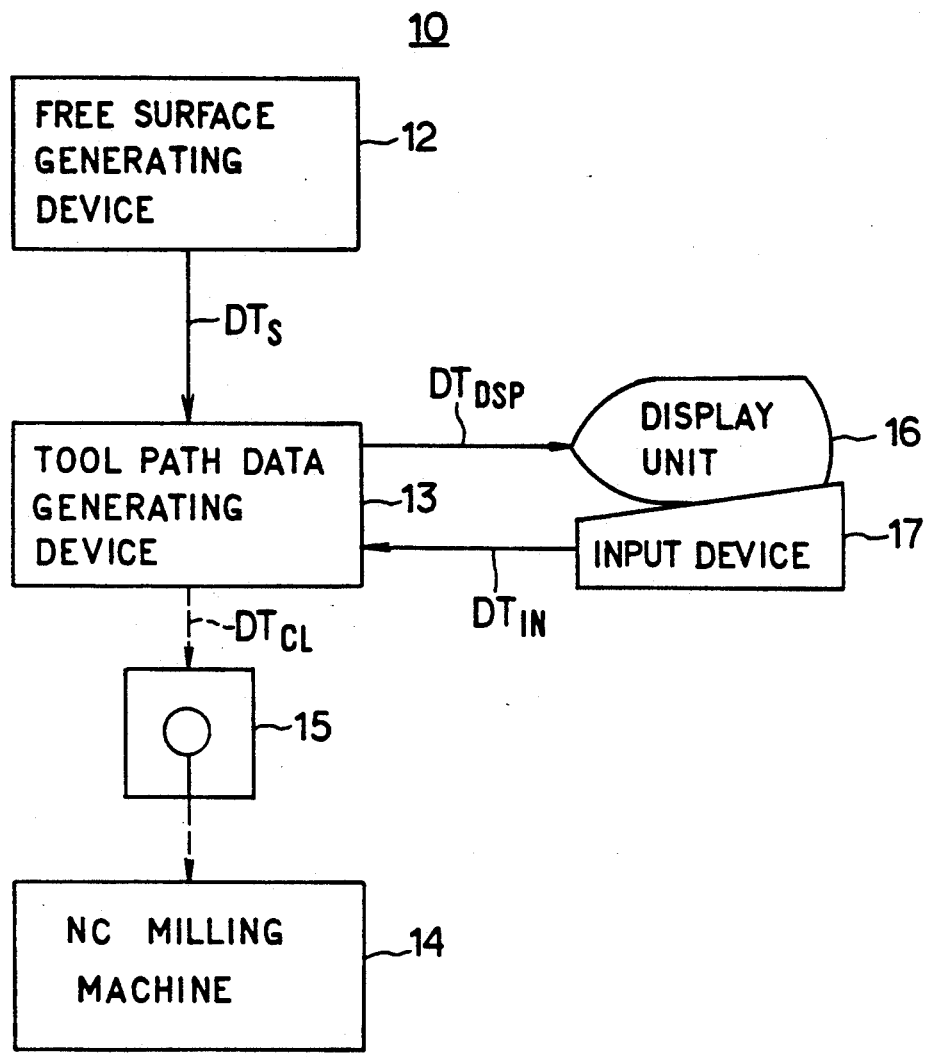
FIG. 5 is a block diagram representing a CAD/CAM system pursuant to one embodiment of the present invention.

Referring now to the drawings, particularly to FIG. 5, the preferred embodiment of a machining data generating method, according to the present invention, is applicable to a CAD/CAM system as illustrated. The CAD/CAM system is generally represented by the reference numeral 10. The CAD/CAM system 10 includes a free or random surface generating device 12, a tool path data generating device 13 and a numerically controlled (NC) milling machine (machining center) 14. The free or random surface generating system 12, the tool path data generating device 13 and the NC milling machine (machining center) 14 are each provided with their own CPU (central processing units).

The free surface generating device 12 generates the form data $DT_s$ of a desired configuration of the article, the outer surface of which is defined by a plurality of interconnected quadrilateral patches S(u, v). For generating the form data $DT_s$, CAD technology may be used. The tool path data generating device 13 receives the form data $DT_s$ from the free surface data generating device 12. Based on the received form data $DT_s$, the tool path data generating device 13 generates the machining data $DT_{CL}$ for roughly machining and finishing a metallic mold according to the form data $DT_s$, and then outputs the machining data $DT_{CL}$ for rough machining and finishing to an NC milling machine 14 through, for example, a floppy disk 15.

The NC milling machine 14 is intended for milling by means, for example, of a flat end mill according to the machining data $DT_{CL}$, thereby preparing a metallic mold of the product indicated by the form data $DT_s$.

The tool path data generating device 13 is capable of receiving as input conditions such as the type of machining tool and the like as occasion demands from an input device 17, and providing display on a display unit 16.

(2) Preparation of grid points

Figure 6:
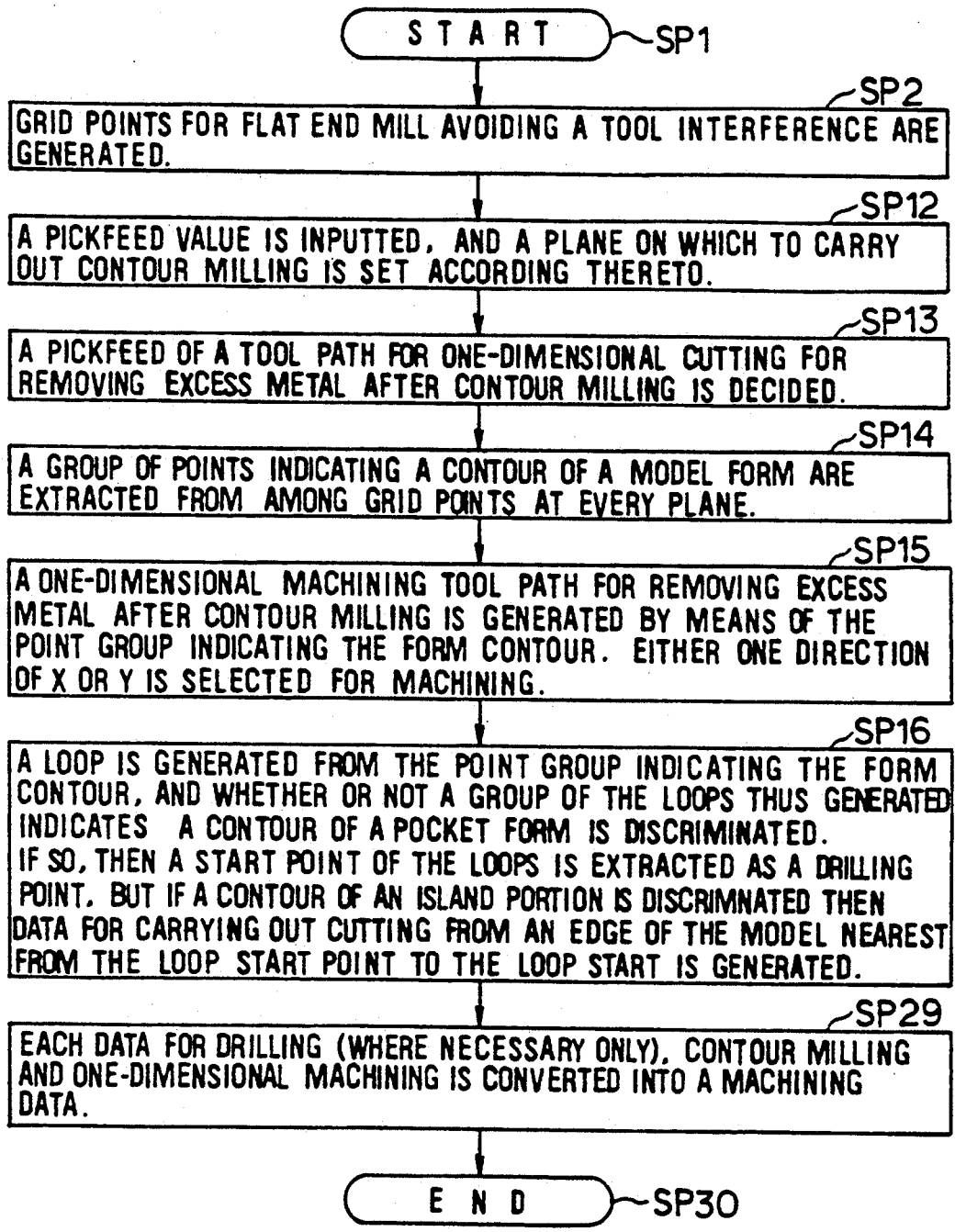
FIG. 6 is a flowchart illustrating the operation of the CAD/CAM system depicted in FIG. 5.

When generation of the machining data $DT_{CL}$ is initiated by operators through the input device 17, 20 the CPU of the tool path data generating device 13 executes the procedure shown in FIG. 6, thereby generating the machining data $DT_{CL}$ according to the form data $DT_s$.

Before beginning the procedure shown in FIG. 6, the CPU of the tool path data generating device 13 first selects a parting line according to the direction in which the metallic mold opens as determined and input by operators.

Further, when the parting line is selected, patches are generated along the parting line according to the size of the metallic mold determined and inputted by operators, thereby generating a parting surface on the product indicated by the form data $DT_s$.

Thus the CPU of the tool path data generating device 13 applies a preliminary process to the form data $DT_s$, and prepares form data (a final machining target of the metallic mold indicated by the form data, called the model hereinafter) indicating the form of the interface of a male die and a female die, for example, which are intended for preparing the product indicated by the form data $DT_s$.

On the other hand, when the form data is already prepared completely on the model, the CPU of the tool path data generating device 13 shifts from step SP1 to step SP2, where grid points for a flat end mill which avoids tool interference are prepared.

Figure 7:
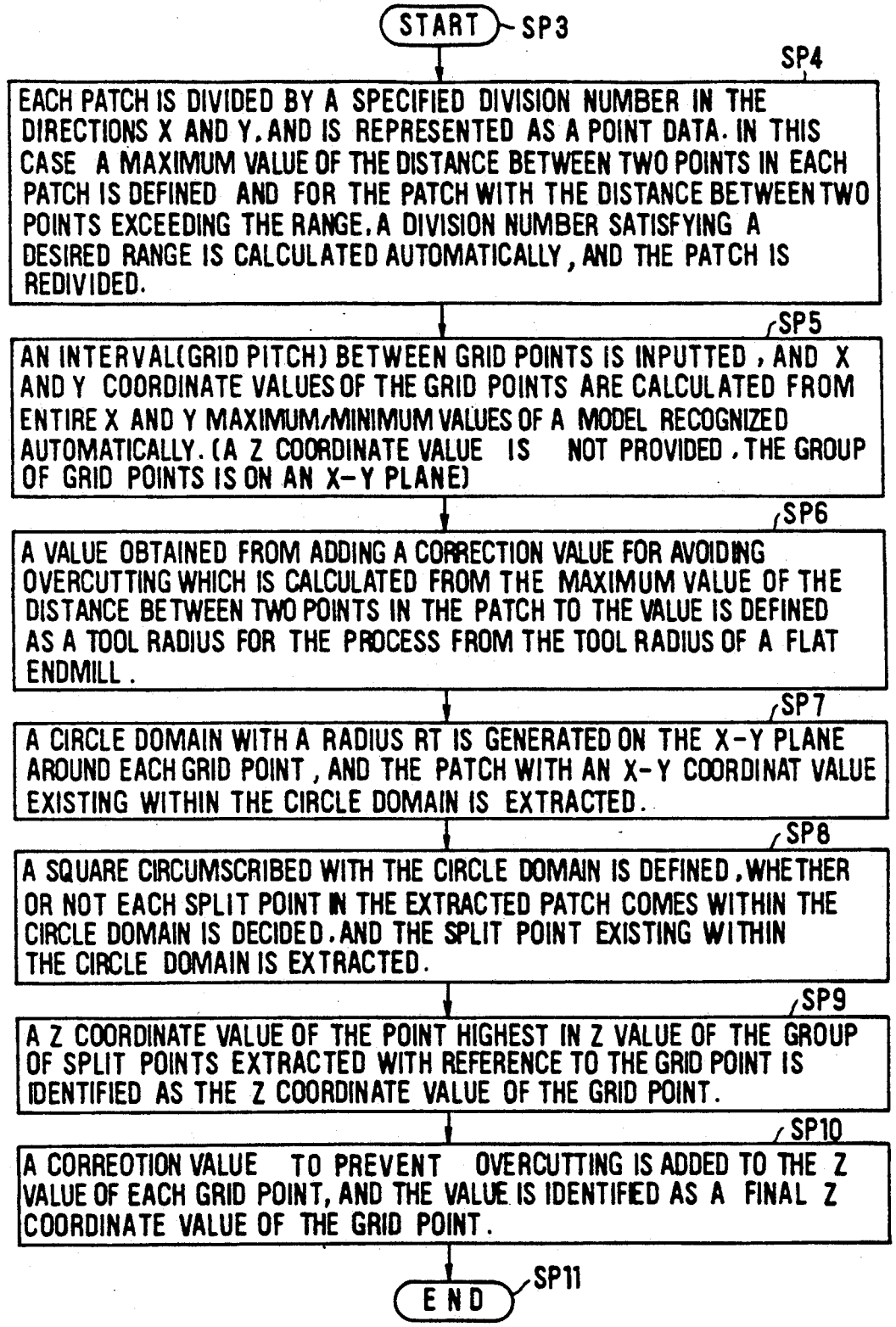
FIG. 7 is a flowchart illustrating a process for generating grid points.

Here the grid points refer to gridiron points capable of cutting an outline form of the model without overcutting and which are generated from carrying out the subroutine procedure shown in FIG. 7.

That is, the CPU of the tool path data generating device 13 shifts from step SP3 to step SP4, where each patch is split, and a form of each patch is represented by a point data.

Figure 8:
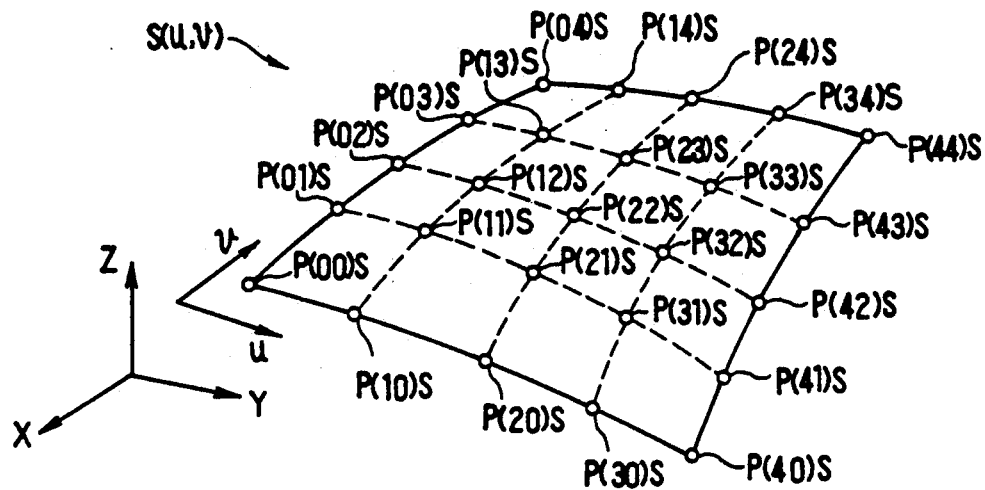
FIG. 8 is a diagram illustrating the generation of split points.

To parametrically split a patch S(u, v) (denoted by a vector) by a split number BN initialized beforehand in the directions u and v and generate points (hereinafter called split points) in the number determined by the split number BN on the patch S(u, v), as best shown in FIG. 8, the patch S(u, v) is split into four segments along both the u and v directions, thereby creating 25 split points P(00)S to P(04)S, P(10)S to P(14)S, P(20)S to P(24)S, P(30)S to P(34)S, P(40)S to P(44)S (hereinafter represented by vector P(i, j)S, i, j=0, 1, 2, 3, 4) on the patch S(u, v).

Practically, a value 10 is set as an initial value of the split number BN, whereby a form of the patch S(u, v) is given by 121 split points.

The CPU of the tool path data generating device 13 executes an arithmetic operation:

$$R_K = \frac{R}{3} \tag{9}$$

according to a radius R of the rough mach end mill determined and input beforehand by operators, and specifies a maximum value $R_K$ of the distance.

Further, with reference to the adjacent split points P(i, j)S, the CPU of the tool path data generating device 13 detects the horizontal distances (or distances in a plane XY when the split points P(i, j)S are mapped on the plane XY) $D_{XY}$ in sequence, and then detects the patch S(u, v) with the distances being the maximum value of $R_K$ or more.

Still further, with reference to the patch S(u, v) with the distances $D_{XY}$ being on the maximum value $R_K$ or more, the CPU of the tool path data generating device 13 resets a split number $BN_{NEW}$ from carrying out an arithmetic operation $$BN_{NEW} = (INT [D_{XY}/R_K] + 1) * BN \tag{10}$$

and resplits the patch S(u, v) by the split number $BN_{NEW}$.

In Eq. (10), INT $[D_{XY}/R_K]$ comprises the operation of rounding a decimal of the value $D_{XY}/R_K$ down to an integral value.

Thus, in the model, the form is represented at the split points with the horizontal distances $D_{XY}$ being equal to or less than $R_X$, and in the embodiment for preparing the machining data for rough machining on the split points, the form of the patch S(u, v) is given with a precision which is sufficient in practice and the time for preparing the machining data $DT_{CL}$ is shortened.

The CPU of the tool path data generating device 13 then shifts to step SP5, where grid points are set tentatively.

Here the CPU detects maximum values $X_{MAX}$, $Y_{MAX}$, $Z_{MAX}$ and minimum values $X_{MIN}$, $Y_{MIN}$, $Z_{MIN}$ from the split points P(i, j)S detected in step SP4, thereby detecting the size as the model in the directions X, Y and Z.

According to the detection result, gridiron points are generated at a grid pitch DD input by operators, and the points are set tentatively to the grid points (with the Z coordinate value of the grid points being set tentatively to 0 as a result).

The grid points are set tentatively in sequence with reference to the tool radius R at the grid pitch DD at the positions where both the X and Y coordinate values are R.

Thus, in the embodiment, the Z coordinate value of the grid points generated in step SP5 is reset to a value which is determined by the split points P(i, j)S, thereby finally determining the Z coordinate value of the grid points.

Here the grid pitch is capable of being input in interactive from, and is set to a value (about 2.5 mm when, for example, the tool radius is 10 mm) which is small as compared with the tool radius R for rough machining.

The CPU then shifts to step SP6, where a tool radius RT for the process is calculated from the tool radius R of the flat end mill.

That is, in the embodiment, a Z coordinate of the grid points GP(i, j) is reset from the split points P(i, j)S indicating a form of the model, thereby preparing the machining data $DT_{CL}$.

Figure 9:
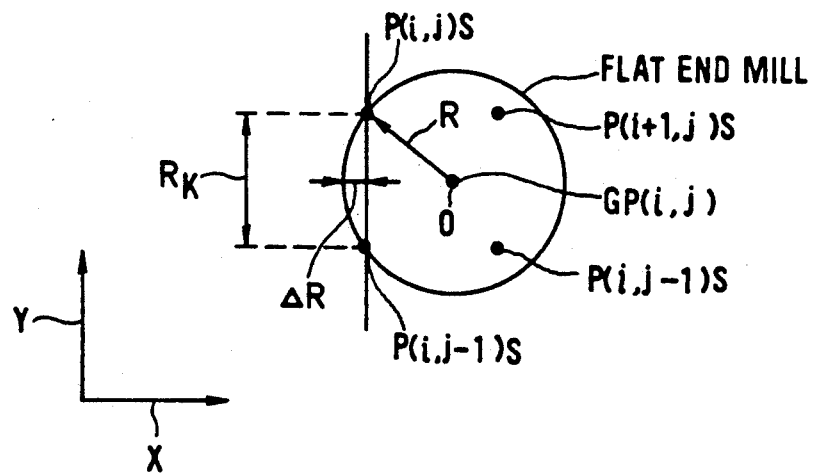
FIG. 9 is a diagram illustrating the correction of a tool radius.

Accordingly, as shown in FIG. 9, in the plane XY, a center 0 of the flat end mill coincides with the grid point GP(i, j), and if a section of the flat end mill comes out of a straight line connecting the split points P(i, j)S and P(i, j−1)S in this case, then overcutting is possible.

Thus, the arithmetic operation $$RT = R + \Delta R \tag{11}$$

is executed to calculate the tool radius RT for the process, and the machining data $DT_{CL}$ is prepared by means of the tool radius RT for the process, thereby preventing overcutting.

Here, in case the patch S(u, v) is split according to Eq. (9), ΔR will be set to a value obtained through:

$$\Delta R = R - \sqrt{R^2 - \left(\frac{R_K}{2*3}\right)^2} \tag{12}$$

Figure 10:
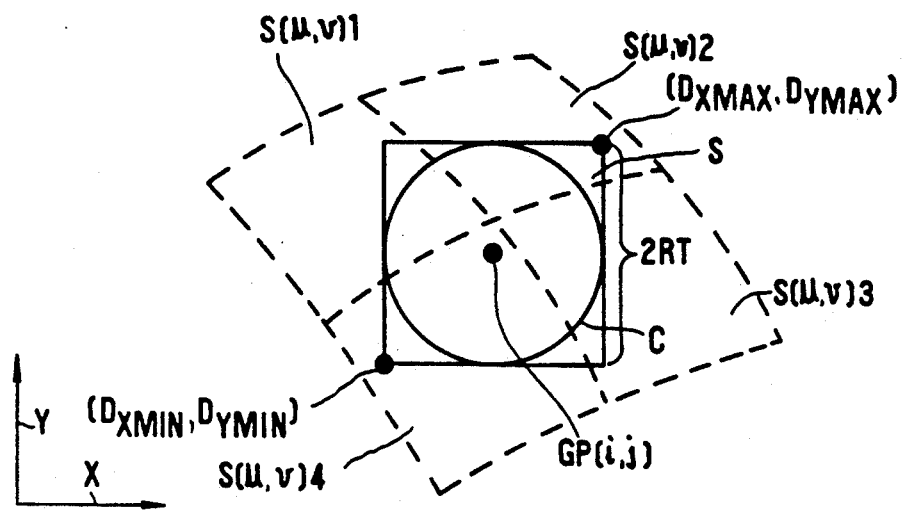
FIG. 10 and FIG. 11 are diagrams illustrating the extraction of a patch.

Next, the CPU of the tool path data generating device 13 shifts to step SP7, where a circle domain C with the tool radius RT is generated, as shown in FIG. 10, at each grid point GP(i, j).

The CPU then detects the patches S(u, v) with the X and Y coordinate values included within the circle domain C at every grid point GP(i, j).

In this case the CPU detects maximum values $X_{MAXP}$, $Y_{MAXP}$ and minimum values $X_{MINP}$, $Y_{MINP}$ of the X and Y coordinates of the split point P(i, j)S for each patch S(u, v), and also detects maximum values $D_{XMAX}$, $D_{YMAX}$ and minimum values $D_{XMIN}$, $D_{YMIN}$ of the X and Y coordinates of each circle domain C.

Figure 11:
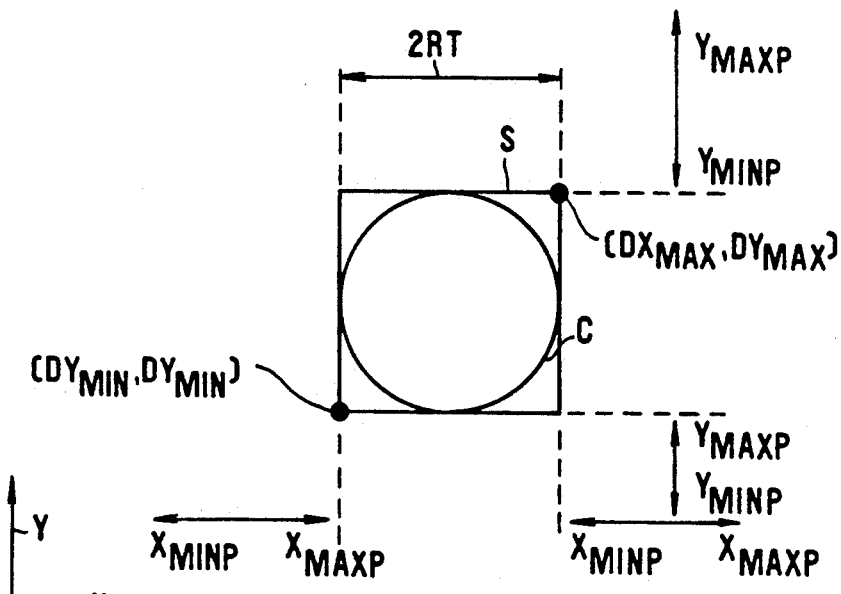

Further, as shown in FIG. 11, a patch with the coordinate values $X_{MAXP}$ and $X_{MINP}$ smaller than the coordinate value $D_{XMIN}$, a patch with the coordinate values $X_{MAXP}$ and $X_{MINP}$ larger than the coordinate value $D_{XMAX}$, a patch with the coordinate values $Y_{MAXP}$, $Y_{MINP}$ smaller than the coordinate value $D_{YMIN}$, and a patch with the coordinate values $Y_{MAXP}$, $Y_{MINP}$ larger than the coordinate value $D_{YMAX}$ are chosen sequentially at every circle domain C, and thus a patch With the X and Y coordinate values included within a square domain S 2RT per side which contains with each circle domain C is extracted at every grid point GP(i, j).

Thus the CPU decides whether or not the X and Y coordinate values are included within the circle domain C for the patch extracted as above, thereby detecting easily the patches S(u, v)1 to S(u, v)4 included within the circle domain C at every grid point GP(i, j) set tentatively.

Figure 12:
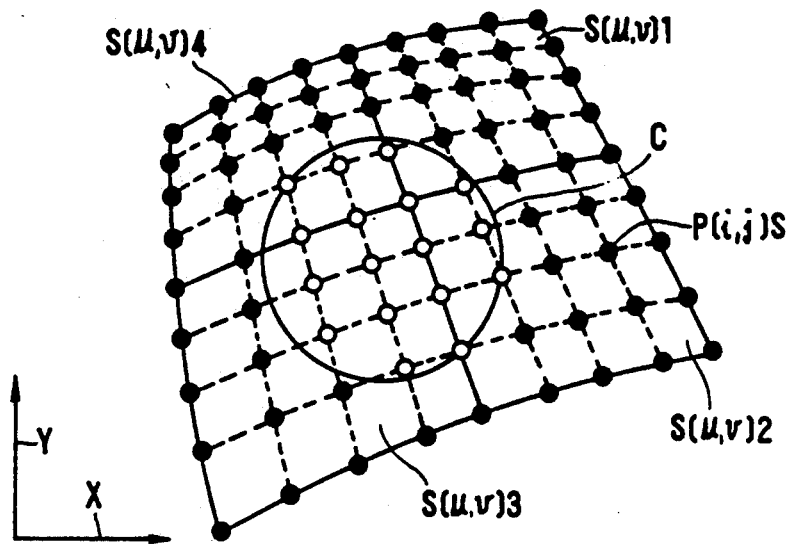
FIG. 12 is a diagram illustrating the extraction of split points.

The CPU then shifts to step SP8, extracting the split points P(i, j)S with the X and Y coordinate values existing within the circle domain C, as shown in FIG. 12, for the patches S(u, v)1 to S(u, v)4 extracted in step SP7.

In the process above, a result obtained by comparing the X and Y coordinate values of the split points P(i, j)S with the maximum values $D_{XMAX}$, $D_{YMAX}$ and the minimum values $D_{XMIN}$, $D_{YMIN}$ is obtained as in the case where the patches S(u, V)1 to S(u, V)4 are extracted in step SP7. The split points P(i, j)S having the X and Y coordinate values within the square domain S 2RT per side which contain each circle domain C are determined. Then it is determined whether or not the extracted split points P(i, j)S are present within the circle domain C, thereby extracting easily the split points P(i, j)S having X and Y coordinate values within the circle domain C.

Thus, in the CPU, the split points P(i, j)S are generated according to the condition of Eq. (9), thereby extracting a plurality of split points
P(i, j)S for every circle, domain C.

Next the CPU shifts to step SP9 to extract a Z coordinate of the extracted split points P(i, j)S, and detects a maximum value $Z_{PMAX}$ of the Z coordinate for every circle domain C.

Further, a Z coordinate value of the grid point GP(i, j) set tentatively is updated by the detected maximum value $Z_{PMAX}$, thus resetting the grid point GP(i, j).

The CPU then shifts to step SP10, where the Z coordinate value of the reset grid point GP(i, j) is corrected.

Here the CPU detects differences in the Z coordinate value between the adjacent points P(i, j)S in sequence at every patch S(u, v)1 to S(u, v)4 extracted in step SP7, and then detects the maximum value $\Delta Z$ thereof, thereby detecting the greatest slope of the patches S(u, v)1 to S(u, v)4 included in the circle domain C with reference to the Z coordinate value.

The CPU then adds the maximum value $\Delta Z$ to the Z coordinate value $Z_{PMAX}$ updated in step SP9, corrects the Z coordinate value of each grid point GP(i, j) thereby, and then shifts to step SP11 to end the procedure.

That is, when the maximum value $Z_{PMAX}$ of the Z coordinate values is detected with reference to the split points P(i, j)S existing within each circle domain C, the grid point GP(i, j) is thus reset, and a rough machining is applied so that the nose of the flat end mill will come to the reset grid point GP(i, j), and overcutting will not occur on the split points P(i, j)S existing within the circle domain C.

Figure 13:
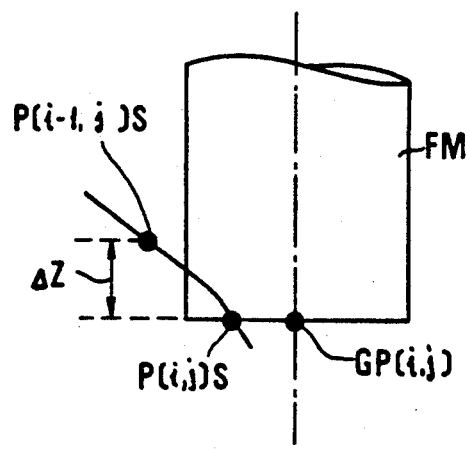
FIG. 13 is a diagram illustrating the correction of a 2 coordinate value.

However, forms of the patches S(u, v)1 to S(u, v)4 are represented by the split point P(i, j)S, as shown in FIG. 13, so that if a portion with a Z coordinate greater than the maximum value $Z_{PMAX}$ exists within each circle domain C, then overcutting may result at such portion.

Accordingly, in the embodiment, the greatest slope of the patches S(u, v)1 to S(u, v)4 is detected with reference to the Z coordinate value, and then the Z coordinate value $Z_{PMAX}$ of the grid point GP(i, j) is corrected according to the detection result, thereby effectively preventing overcutting.

Figure 14:
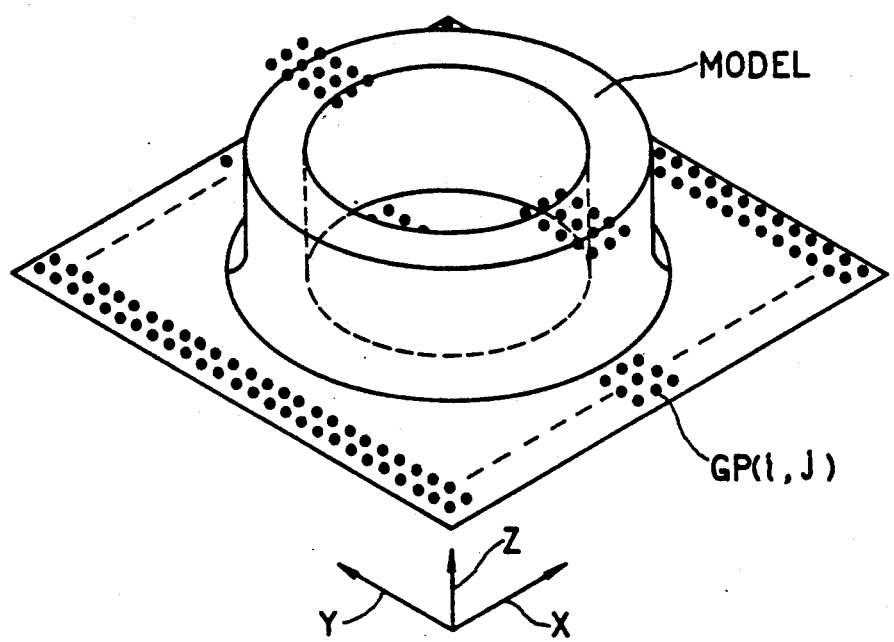
FIG. 14 is a schematic diagram for illustrating the setting of a grid point.

Thus, as shown in FIG. 14, in a rough machining using the flat end mill FM of the tool radius R, the grid point GP(i, j) for cutting an outline form of the model without overcutting may be set, and a form of the model is represented by the split points P(i, j)S, thereby generating the grid point GP(i, j) through a simple arithmetic operation.

(3) Preparation of machining data

When the grid point GP(i, j) is generated, the CPU of the tool path data generating device 13 shifts to step SP12 (FIG. 6), setting a plane for contour milling.

Figure 15:
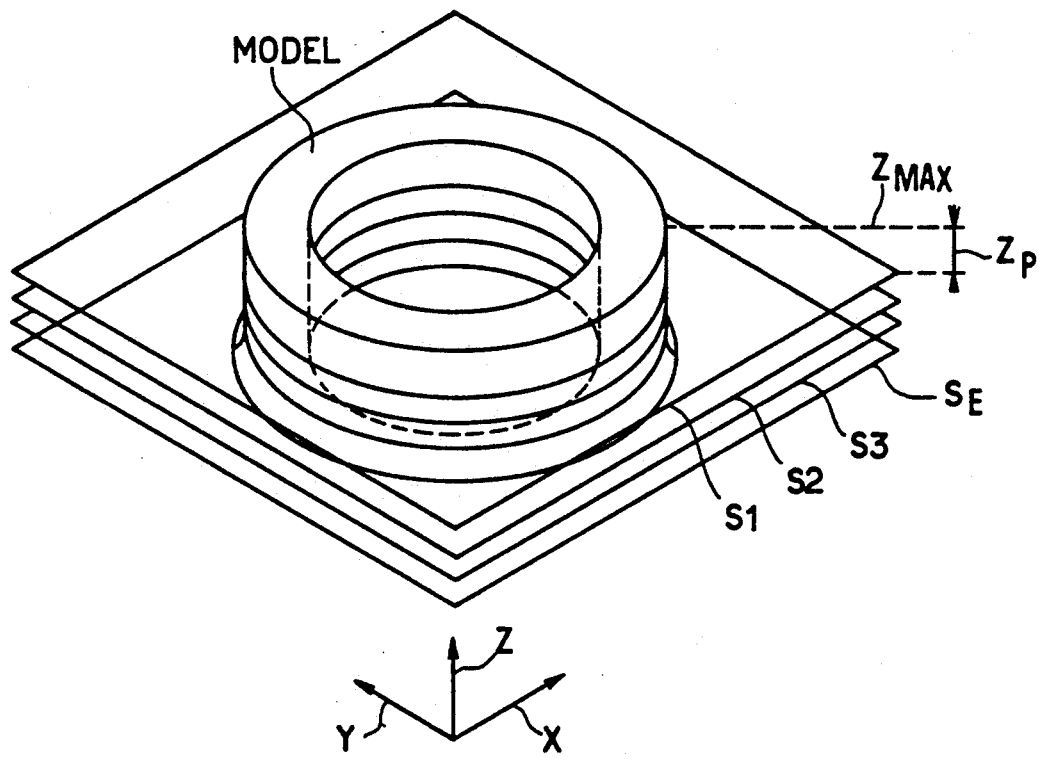
FIG. 15 is a diagram illustrating the setting of cut plane.

That is, as shown in FIG. 15, in accordance with the maximum value $Z_{MAX}$ of Z coordinate value detected in step SP5 and a Z pickfeed value ZP assigned beforehand and input by the operator, planes S1, S2, S3 (hereinafter called cut planes) orthogonal to an axis Z are set sequentially from the maximum value $Z_{MAX}$ at intervals of the Z pickfeed value $Z_P$.

The CPU also sets a cut plane SE for the minimum value $Z_{MIN}$ of the Z coordinate value.

The CPU of the tool path data generating device 13 then shifts to step SP13, where a cut pitch (hereinafter called pickfeed value) PIC is set at the time when excess metal remaining after contour milling is cut.

Here, the CPU inputs a pickfeed value PIC which is a integral number of times of the grid pitch DD and satisfies the expression:

$$PIC < 2R \quad (13)$$

With reference to the tool radius R of the flat end mill FM.

Thus, in the CPU, tool paths are formed so that a tool center of the flat end mill FM will pass on the grid point GP(i, j).

A value which is an integral number of times the grid pitch DD, satisfying Eq. (13) and closest to a value 0.8R with reference to the tool radius R, is displayed as a candidate of the pickfeed value PIC through the display unit 16, and the operator can set the pickfeed value PIC easily.

Thus, for cutting with the candidate of the pickfeed value PIC given on the display unit 16, the pickfeed value PIC can easily be set by turning the switch "y" on without giving any consideration to the grid pitch or other factors.

On the other hand, when cutting is desired in a pitch other than the candidate of the pickfeed value PIC, a candidate $PIC_K$ of the pickfeed value PIC is updated to a value given as:

$$PIC = PIC_K - DD \quad (14)$$

by turning a switch "n" on, and is so displayed.

Thus an operator may set the pickfeed value PIC easily according to candidates of the pickfeed value PIC which are displayed successively on the display unit 16.

When the pickfeed value PIC is set, the CPU shifts to step SP14, where a point indicating an outline form of the model (hereinafter called contour point) is generated from the grid point GP(i, j) at every cut plane S1, S2, S3, SE.

Figure 16:
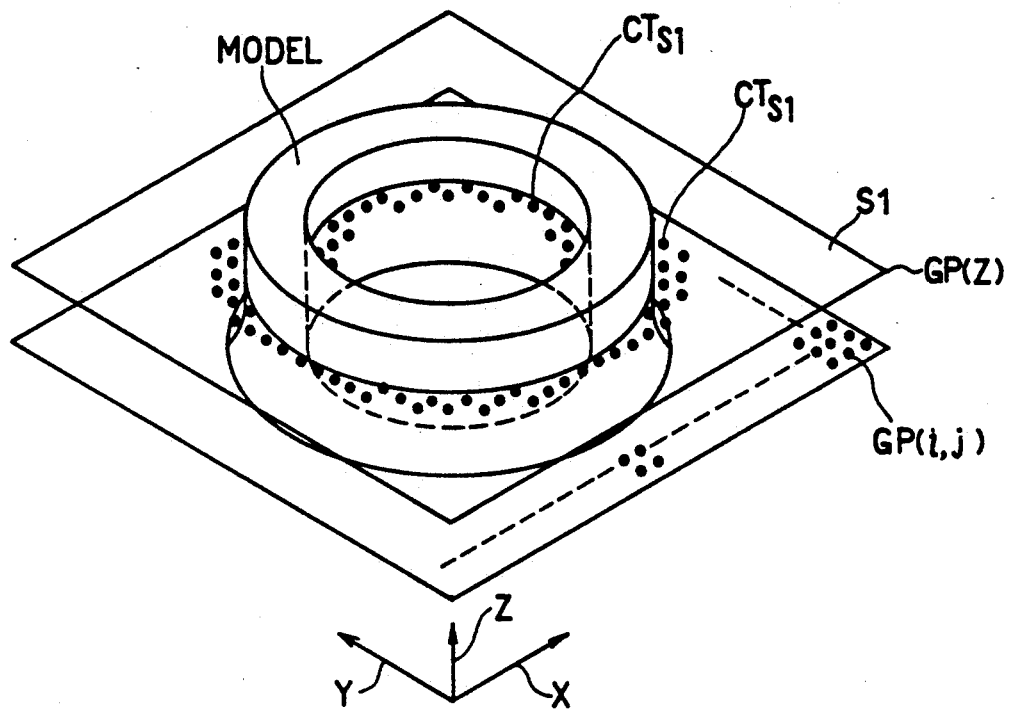
FIG. 16 and FIG. 17 are diagrams illustrating the setting of contour points.

That is, as shown in FIG. 16, a Z coordinate value $Z_{S1}$ of the cut plane S1 is compared first with a Z coordinate value GP(Z) of the grid point GP(i, j) successively, and the grid point GP(i, j) satisfying a relation given as:

$$GP(Z) \leq Z_{S1} \quad (15)$$

is extracted.

Figure 17:
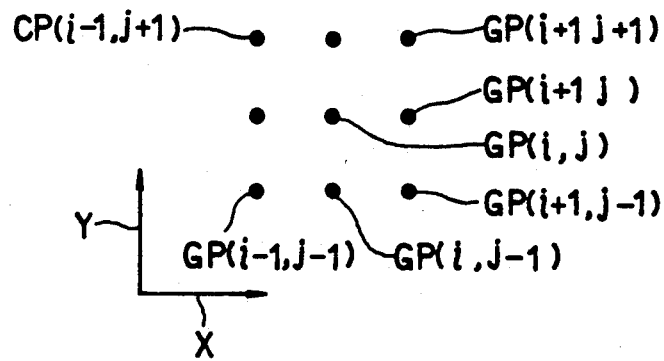

Further as shown in FIG. 17, for grid points GP(i−1, j−1) to GP(i+1, j+1) around the extracted grid point GP(i, j), it is determined whether or not any of the grid points GP(i−1, j−1) to GP(i+1, j+1) satisfy a relation given as:

$$GP(Z) > Z_{S1} \tag{16}$$

Here, if even one point of the grid points GP(i−1, j−1) to GP(i+1, j+1) satisfies the relation of Eq. (16), then the CPU sets a contour point $CT_{X1}$ having X and Y coordinate values of the grid point GP(i, j) on the cut plane Thus, in the cylindrical model shown in FIG. 16, when the model is cut by the cut plane S1, the contour point $CT_{X1}$ indicating the contour of a cut face of the model is obtainable.

On the other hand, where none of the grid points GP(i−1, j−1) to GP(i+1, j+1) satisfy Eq. (15), a coordinate data (hereinafter called auxiliary data) having a flag indicating that the grid point GP(i, j) is present under the cut plane S? and also having the X and Y coordinate values of the grid point GP(i, j) is prepared.

Then, for the grid point GP(i, j) not satisfying Eq. (15), the auxiliary data having a flag indicating that the grid point GP(i, j) is present over the cut plane S1, and also having the X and Y coordinate values of the grid point GP(i, j) is prepared.

In regard to the cut plane S1, when generation of the contour point $CT_{S1}$ and the auxiliary data is completed, the CPU generates a contour point $CT_{S2}$ and the auxiliary data likewise for the continuing cut plane S2.

Thus, the CPU generates contour points $CT_{S1}$ to $CT_{SE}$ and the auxiliary data successively for the cut planes S1, S2, S3, SE. (3-1) Preparation of one-dimensional machining tool path When the contour points $CT_{S1}$ to $CT_{SE}$ and the auxiliary data are generated, the CPU of the tool path data generating device 13 shifts to step SP15 to prepare a one-dimensional machining tool path.

The one-dimensional machining refers to a milling operated by means of a flat end mill, wherein the X or Y coordinate value is changed in successive steps, and the milling is repeated in the direction Y or X, thereby cutting excess metal remaining from the contour milling.

Figure 18:
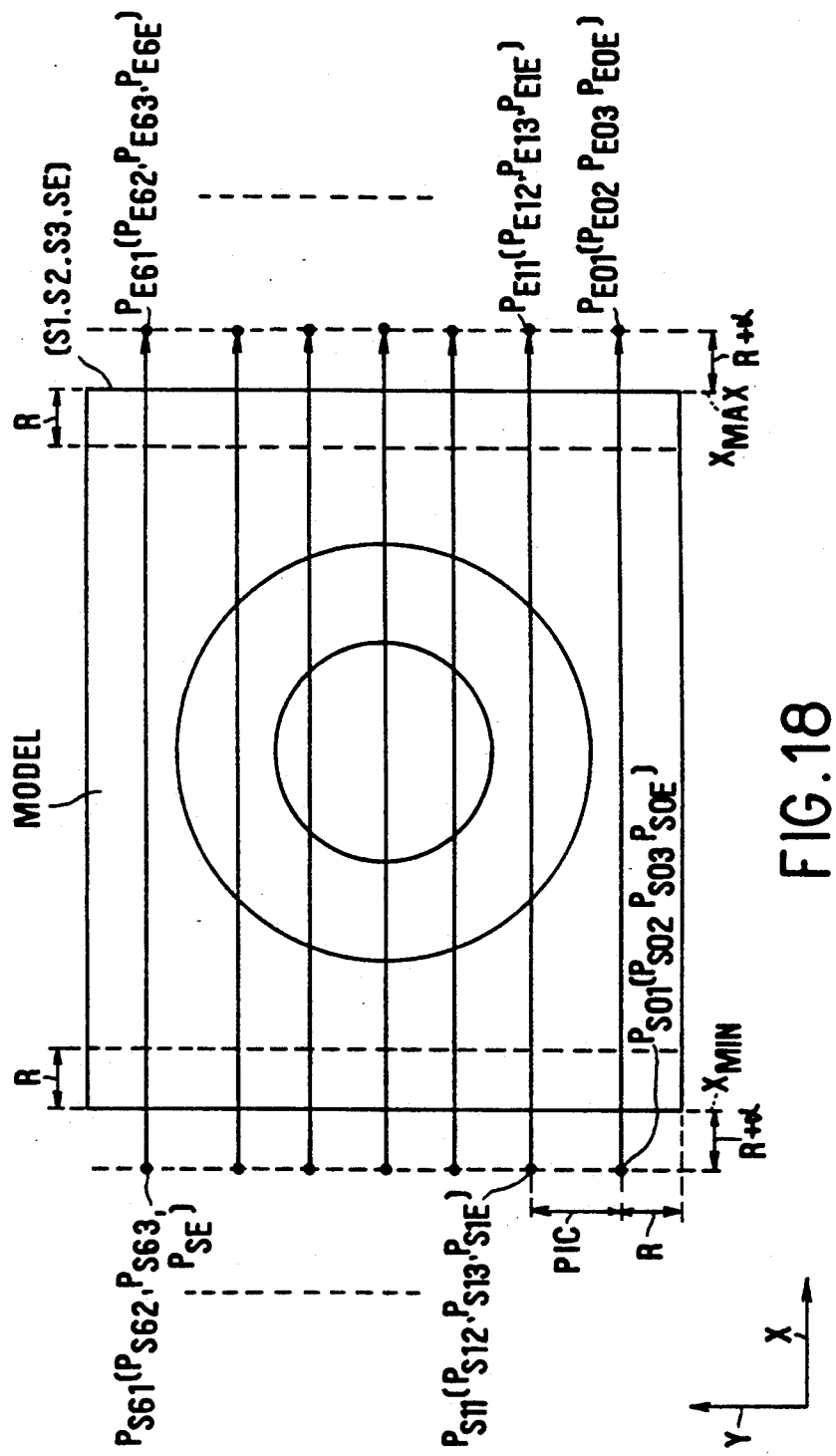
FIG. 18 is a diagram illustrating a one-dimensional machining.

As shown in FIG. 18, the CPU sets the entire start points $P_{S01}$, $P_{S02}$, $P_{S03}$, $P_{S0E}$ of the cut planes S1, S2, S3, SE respectively on the cut planes S1, S2, S3, SE, and then sets start points $P_{S11}$, $P_{S21}$, ..., $P_{S12}$, $P_{S22}$, ..., $P_{S13}$, $P_{S23}$, ..., $P_{S1E}$, $P_{S2E}$, ..., and end points $P_{E01}$, $P_{E11}$, ..., $P_{E02}$, $P_{E12}$, ..., $P_{E03}$, $P_{E13}$, ..., $P_{E0E}$, $P_{E1E}$, with reference to the start points $P_{S01}$, $P_{S02}$, $P_{S03}$, $P_{S0E}$.

When the operator inputs the direction X as that for one-dimensional machining, points where the Z coordinate value is GP(Z) of the cut planes S1, S2, S3, SE, the X coordinate value is $X_{MIN}(R+\alpha)$, $\alpha$ being set at 2 mm normally here, and the Y coordinate value is R are set to the entire start points $P_{S01}$, $P_{S02}$, $P_{S03}$, $P_{S0E}$.

On the other hand, the start points $P_{S11}$, $P_{S21}$, ..., $P_{S12}$, $P_{S22}$, ..., $P_{S13}$, $P_{S23}$, $P_{S2E}$, ... are set at positions displaced from the entire start points $P_{S01}$, $P_{S02}$, $P_{S03}$, $P_{S0E}$ successively in the direction Y by the pickfeed value PIC.

Then the end points $P_{E01}$, $P_{E11}$, ..., $P_{E02}$, $P_{E12}$, ..., $P_{E03}$, $P_{E13}$, ..., $P_{E0E}$, $P_{E1E}$, ...are at Y and Z coordinate values equal to the start points $P_{S01}$, $P_{S11}$, ..., $P_{S02}$, $P_{S12}$, ..., $P_{S13}$, ..., $P_{S0E}$, $P_{S1E}$, respectively, and set at positions away from the maximum value $X_{MAX}$ of the coordinate value in the direction X by the distance $R+\alpha$.

Thus, as indicated by arrows in FIG. 14, the CPU generates tool paths along straight lines connecting the corresponding start points $P_{S01}$, $P_{S11}$, ..., $P_{S02}$, $P_{S12}$, ..., $P_{S03}$, $P_{S13}$, ..., $P_{S0E}$, $P_{S1E}$, ... and the end points.

Figure 19:
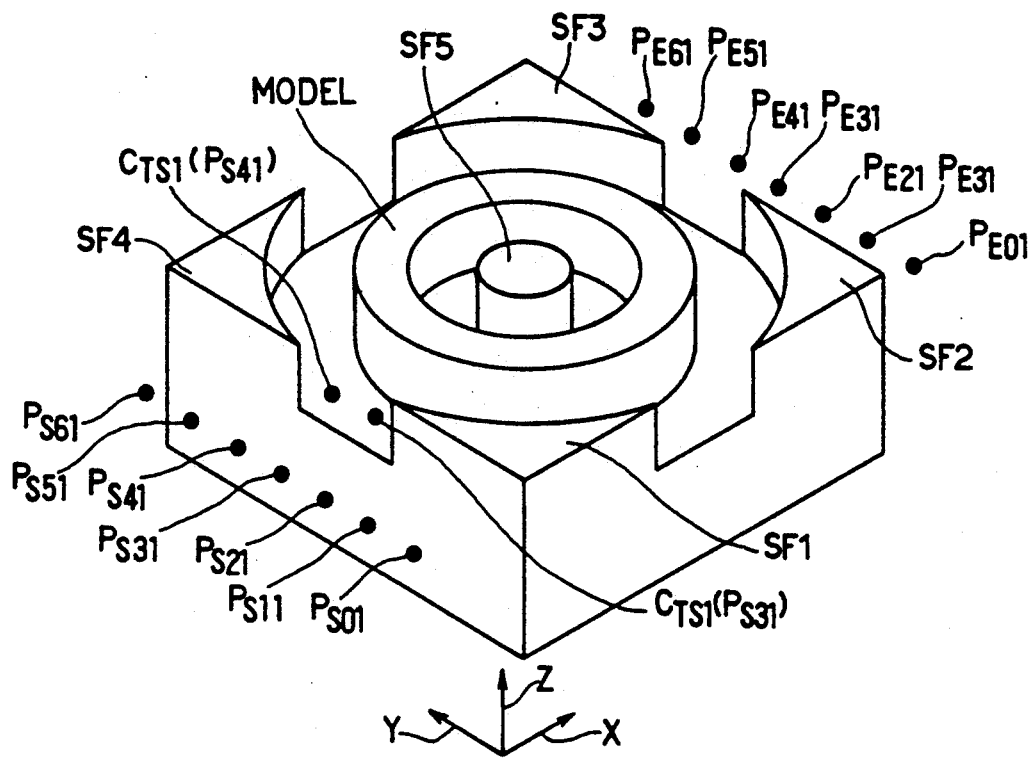
FIG. 19 is a diagram illustrating the resetting of a start point and an end point.

Meanwhile, as shown in FIG. 19, after a contour milling by means, for example, of a flat end mill having a large tool radius R, the superfluous material SF1 to SF4 remaining at four corners of a mold and the superfluous material SF5 remaining centrally thereof must be removed.

That is, a one-dimensional machining carried out from the start points $P_{S21}$, $P_{S31}$, $P_{S41}$ toward the end points $P_{E21}$, $P_{E31}$, $P_{E41}$ respectively may result in a wasteful move of the tool.

Thus, in the embodiment, when the start points $P_{S01}$, $P_{S11}$, ..., to $P_{S0E}$, $P_{S1E}$, ... and the end points $P_{E01}$, $P_{E11}$, ... to $P_{E01}$, $P_{E1E}$, ... are set, the Y coordinate value is equal to the coordinate values of the start points $P_{S01}$, $P_{S11}$, ... to $P_{S0E}$, $P_{S1E}$, ... each, and the X coordinate detects the contour points $CT_{S1}$ to $CT_{SE}$ coming within $X_{MIN}$ to $X_{MIN}+R$, thus detecting portions where superfluous material need not be removed on the side of start points $P_{S01}$, $P_{S11}$, ... to $P_{S0E}$, $P_{S1E}$.

When such a contour point $CT_{S1}$ is detected, the CPU resets the start points $P_{S21}$, $P_{S31}$, $P_{S41}$ to the detected contour point $CT_{S1}$.

Thus, in the embodiment, for the portions where superfluous material need not be removed on the side of start points $P_{S01}$, $P_{S11}$, to $P_{S0E}$, $P_{S1E}$, the tool path for one-dimensional machining will not be generated, thereby shortening the time for rough machining.

Similarly, from detecting the contour points $CT_{S1}$ to $CT_{SE}$ with the Y coordinate value equal to a Y coordinate value of the end points $P_{E01}$, $P_{E11}$, ..., to $P_{E0E}$, $P_{E1E}$, and the X coordinate value coming at $X_{MAX}-R$ from $X_{MAX}$, the CPU detects portions where superfluous material need not be removed on the side of end points $P_{E01}$, $P_{E11}$, ..., to $P_{E0E}$, $P_{E11}$, ....

Further, when such contour points $CT_{S1}$ to $CT_{SE}$ are detected, end points are reset to the detected contour point $CT_{S1}$, and a wasteful tool path is deleted on the side of the end points $P_{E01}$, $P_{E11}$, ..., to $P_{E0E}$, $P_{E1E}$, .... This shortens the time required for rough machining.

When the start points $P_{S01}$, $P_{S11}$, ..., to $P_{S0E}$, $P_{S1E}$, .. and the end points $P_{E01}$, $P_{11}$, ..., to $P_{E0E}$, $P_{E1E}$, ... are set completely, the CPU retrieves the contour points $CT_{S1}$ to $CT_{SE}$ and the auxiliary data along straight lines connecting the start points $P_{S01}$, $P_{S11}$, ..., to $P_{S0E}$, $P_{S1E}$, ... and the corresponding end points $P_{E01}$, $P_{E11}$, ..., to $P_{E0E}$, $P_{E1E}$, ... successively at every cut plane S1, S2, S3, SE.

Here, as described in step SP5, the grid point GP(i, j) is generated at the grid pitch DD with reference to positions of the X and Y coordinate values R, so that the contour points $CT_{S1}$ to $CT_{SE}$ pass over the grid point in the straight paths connecting the start points $P_{S01}$, $P_{S11}$, ..., $P_{S0E}$, $P_{S1E}$, ... and the corresponding end points $P_{E01}$, $P_{E11}$, ..., $P_{E0E}$, $P_{E1E}$, ..., thus detecting them on the straight paths.

Further, in the portions other than the contour points $CT_{S1}$ to $CT_{SE}$, a vertical relation between the cut planes S1 to SE and the model surface can be determined according to the auxiliary data.

From the above relation, the CPU detects the contour points sequentially from the start point $P_{S01}$ toward the end point $P_{E01}$ from the start point $P_{S11}$ toward the end point $p_{E11}$, ... at first in the cut plane S1 which has the greatest Z coordinate.

Figure 20:
FIG. 20 to FIG. 25 are diagrams illustrating the generation of a tool path between the start point and the end point.

Here as shown in FIG. 20, in case the contour point $CT_{S1}$ is not detected between the start point $P_{Sn1}$ and the end point $P_{En1}$ along the straight path, the CPU decides whether or not the grid point GP(i, j) is present under the cut plane S1 according to the auxiliary data between the start point $P_{Sn1}$ and the end point $P_{En1}$, and if an affirmative result is obtained here, the straight path connecting the start point $P_{Sn1}$ and the end point $P_{En1}$ is set to a tool path.

Figure 21:
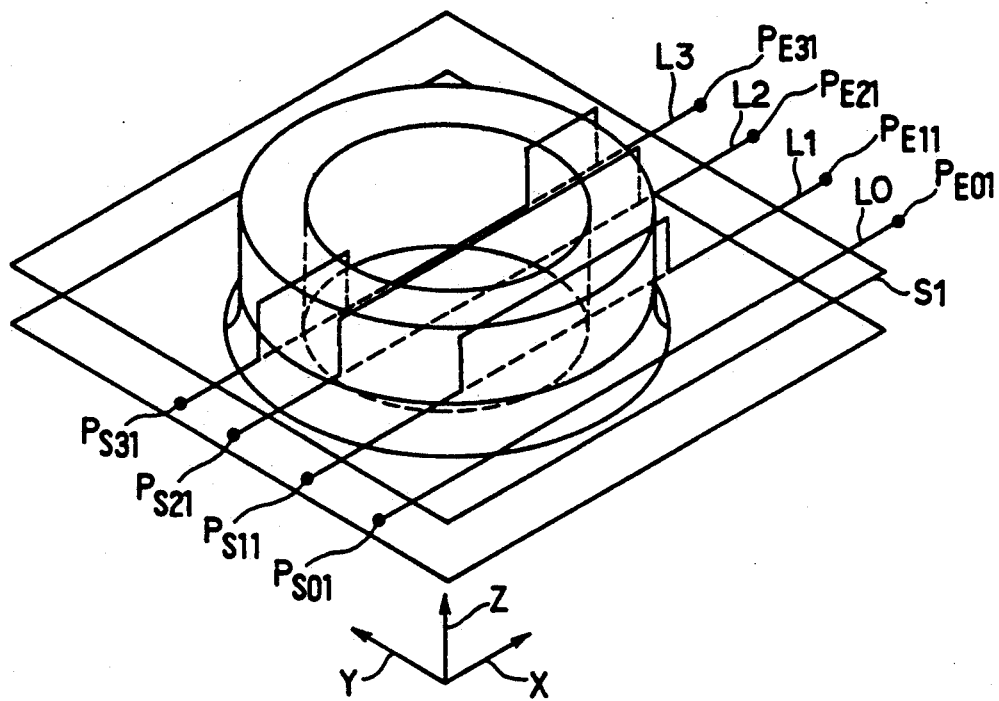

Thus, as shown in FIG. 21, in a straight path L0 which has the smallest in the Y coordinate value, the flat end mill is moved on the tool path connecting the start point $P_{S01}$ and the end point $P_{E01}$ by a straight line, thereby cutting the excess metal along the straight path L0.

Figure 22:
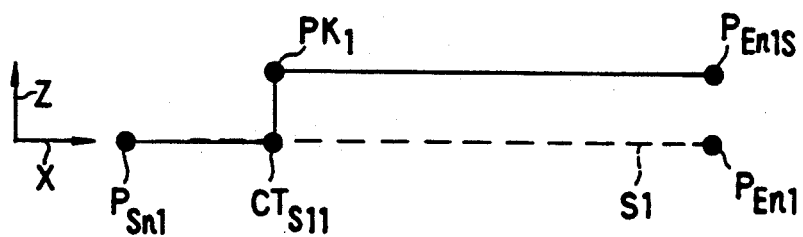

On the other hand, when the contour point $CT_{S11}$ is detected, as shown in FIG. 22, between the start point $P_{Sn1}$ and the end point $P_{En1}$, whether or not the grid point GP(i, j) immediately before is present under the cut plane S1 is decided according to the auxiliary data immediately before the contour point $CT_{S11}$.

If an affirmative result is obtained here, then the CPU sets a reference point $PK_1$ of the tool path over the contour point $CT_{S11}$, and then looks for a contour point on a side of the end point $P_{En1}$ from the contour point $CT_{S11}$.

Here, if the contour point is not detected on a side of the end point $P_{En1}$, then the CPU resets an end point $P_{En15}$ over the end point $P_{En1}$, and thus successively generates tool paths connecting the start point $P_{Sn1}$, the contour point $CT_{S11}$, a reference point $PK_{12}$, and the end point $P_{En15}$.

Figure 23:
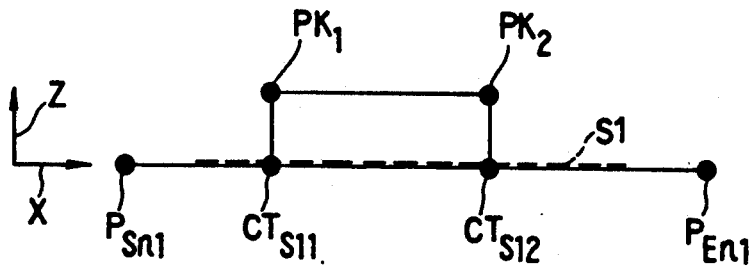

On the other hand, if a contour point $CT_{S12}$ is detected, as shown in FIG. 23, on a side of the end point $P_{En1}$, the CPU then detects a contour point on a side of the end point $P_{En1}$.

If the continuing contour point is not detected here, the CPU sets a reference point $PK_2$ on the contour point $CT_{S12}$, and then generates tool paths connecting successively the start point $P_{Sn1}$, the contour point $CT_{S11}$, the reference point $PK_1$, the reference point $PK_2$, the contour point $CT_{S12}$ and the end point $P_{En1}$.

Thus the tool path along a straight line L1 (FIG. 21) can be generated, and excess metal can be cut along the straight line L1.

Figure 24:
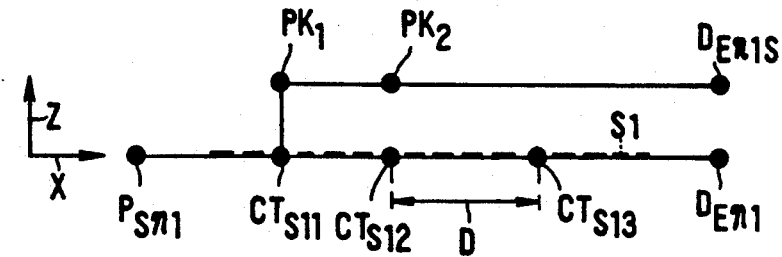

Then, as shown in FIG. 24, when a contour point $CT_{S13}$ is detected after the contour point $CT_{S12}$, the CPU detects a distance D from the contour point $CT_{S12}$ to the contour point $CT_{S13}$, stops setting of the reference point $PK_2$ when the distance D is smaller than a diameter 2R of the flat end mill, and looks for a contour point continuing from the contour point $CT_{S13}$, as in the case where the contour point $CT_{S12}$ continuing from the contour point $CT_{S11}$ is detected.

Thus, in the straight line, like a straight line L2 (FIG. 21) crossing the portion where an excess metal does not remain after contour milling in the recession, a tool path similar to the straight line L1 is generated, and a wasteful vertical move of the ball end mill is prevented to ensure an efficient operation for milling.

Figure 25:
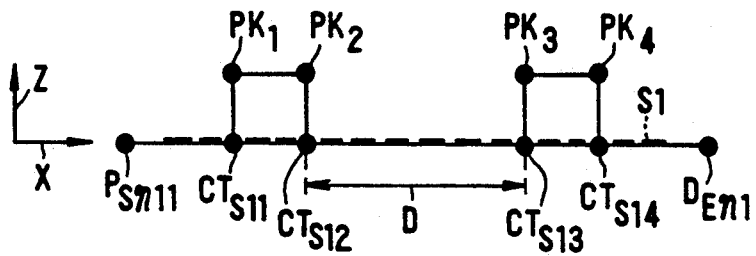

On the other hand, as shown in FIG. 25, when the distance D from the contour point $CT_{S12}$ to the contour point $CT_{S13}$ is larger than the diameter of the flat end mill, the CPU sets the reference point $PK_2$ according to the contour point $CT_{S12}$, and then sets a reference point $PK_3$, as in the case where the reference point $PK_1$ is set according to the contour point $CT_{S11}$.

Further the CPU repeats detection of a contour point in the direction from the contour point $CT_{S13}$ to the end point $P_{En1}$, and thus generates a tool path along the straight line L3 (FIG. 21).

Thus, in the embodiment, at the time of rough machining in the cut plane S1, the Z coordinate value of the reference points $PK_1$, $PK_2$, is set to a value for which a cutting allowance is added to the Z coordinate value $Z_{MAX}$ of the model, and thus an uppermost surface of the model is ready for machining concurrently.

On the other hand, when the grid point GP(i, j) immediately before the contour point $CT_{S11}$ exists over the cut plane S1 (that is, where the start point is reset as mentioned in FIG. 19) contrary to the case of FIG. 22, a start point is reset on the start point as in the case where the end point is reset.

Further, the contour points are detected successively from the first start point to the end point, and the reference points are set successively, thus generating the tool paths.

Thus, for the cut plane S1, the tool paths can be generated from the entire start point $P_{S01}$ sequentially between the start point and the end point.

Further, when the tool path between the start point and the end point is generated completely for the cut plane S1, the CPU generates the tool paths between the start point and the end point successively for the cut planes S2, S3 and SE likewise.

When the tool paths are generated for the cut planes S1 to SE as above, the CPU generates the whole tool path for one-dimensional machining.

Figure 26:
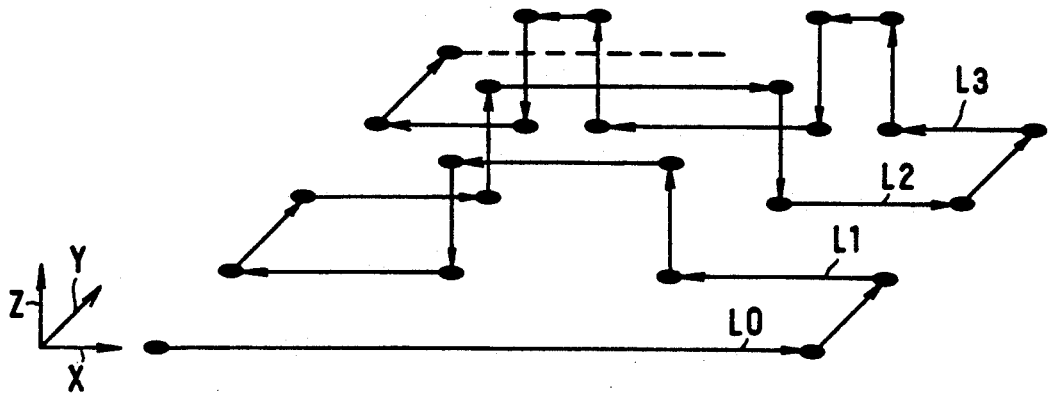
FIG. 26 is a diagram illustrating the generation of the entire tool path.

Here, as shown in FIG. 26, first in the cut plane S1, the coordinate data is changed in array for the straight lines L1, L2, L3, even-numbered from the straight line L0, thereby generating a zigzag tool path.

The CPU consecutively changes the coordinate data likewise for the cut planes S2, S3 and SE, and generates the tool paths also for the cut planes S2, S3 and SE.

In this case, the CPU generates the whole tool path so as to jump over the tool path between the start point and the end point in a portion where excess metal does not remain covering the overall straight line because of, for example, contour milling according to the auxiliary data between the start point and the end point.

Further, from detecting the coordinate data of each start point and the end point, a portion where the start point and end point are reset over the first start point and end point is detected at the portion where the start point and the end point are reset as described with reference to FIG. 19.

The path covering the start point to the next contour point and the path covering a portion of the end point to the contour point immediately preceding the end point comprise a portion where the tool path is generated over the cut plane, and thus the CPU generates the entire tool path by omitting the start point and the end point, thereby preventing a wasteful move of the tool.

(3-2) Preparation of contour milling tool path

Upon generation of the one-dimensional machining tool path, the CPU of the tool path data generating device 13 shifts to step SP16 (FIG. 6), where a tool path for contour milling is generated.

Figure 27:
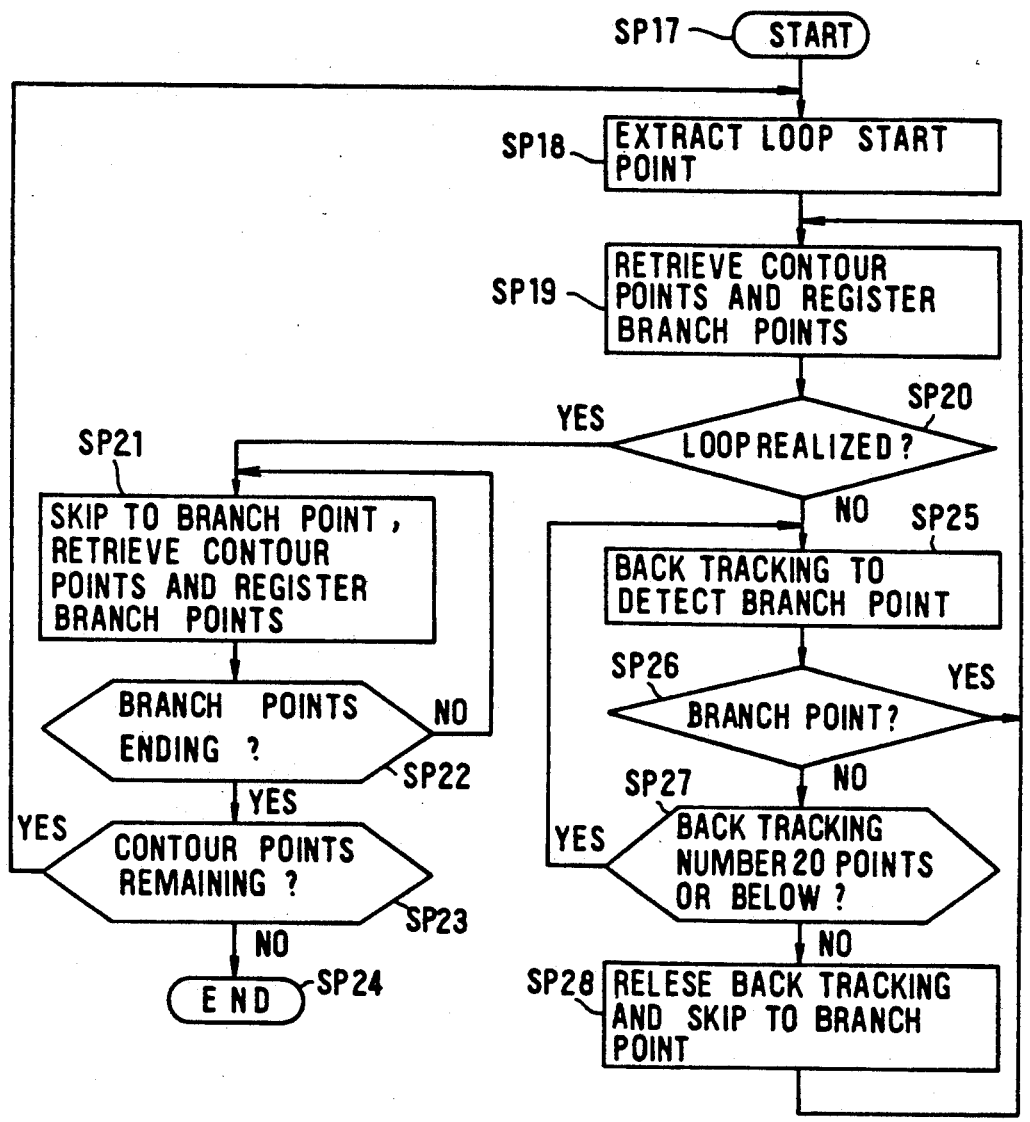
FIG. 27 is a flowchart illustrating the generation of a contour milling tool path.

The process comprises detecting a tool path and a drilling position plane at every cut S1 to SE by repeating the procedure shown in FIG. 27 with reference to the cut planes S1 to SE.

That is, the CPU shifts to step SP18 from step SP17, and detects a loop start point from the contour points on the cut plane S1.

Figure 28:
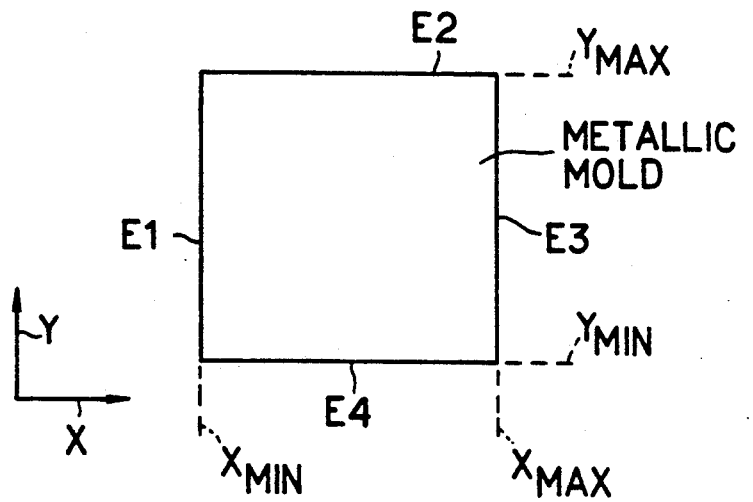
FIG. 28 to FIG. 30 are diagrams illustrating the detection of a loop start point.

Here, the CPU successively detects the contour points $CT_{S1}$ corresponding to the grid points on the outermost periphery of the model (positioned substantially on the edges E1, E2, E3, E4 of the mold as shown in FIG. 28).

Figure 29:
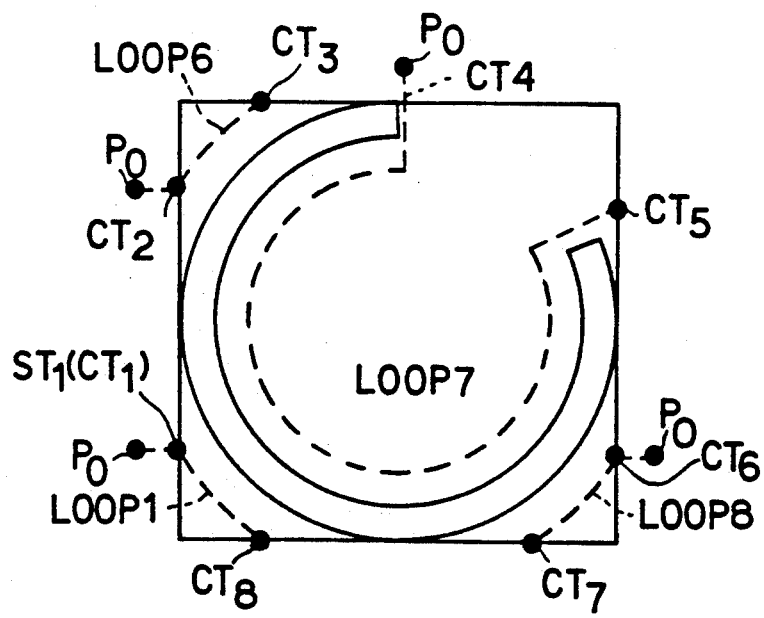

Thus, as shown in FIG. 29, when the contour point $CT_1$ is detected in one edge of the periphery, the CPU sets the contour point $CT_1$ to a loop start point $ST_1$.

Figure 30:
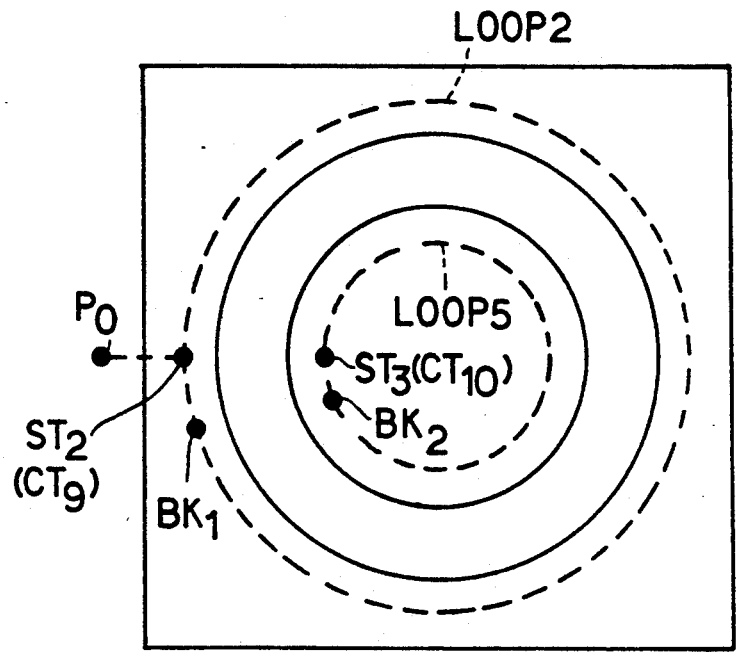
Figure 31:
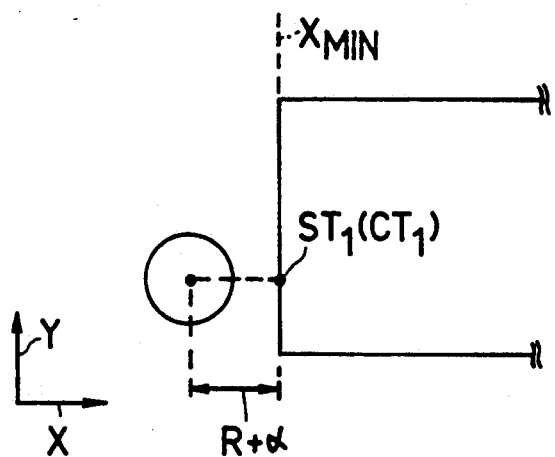
FIG. 31 is a schematic diagram for illustrating the detection of the entire start point for contour milling.

On the other hand, if a contour point is not detected from the grid points on the outermost periphery, as shown in FIG. 30, the CPU extracts the contour point having the smallest X coordinate value from among the contour points of the cut plane S1, then extracts a contour point $CT_9$ having the smallest Y coordinate value from the extracted contour point, and sets the contour point $CT_9$ to a loop start point $ST_2$.

Further, when the loop start point is detected, the CPU decides whether or not the detected loop start point must be subjected to drilling.

Here, the CPU decides that the loop start point $ST_1$ detected from the grid points on the outermost periphery need not be subjected to drilling.

Figure 1:
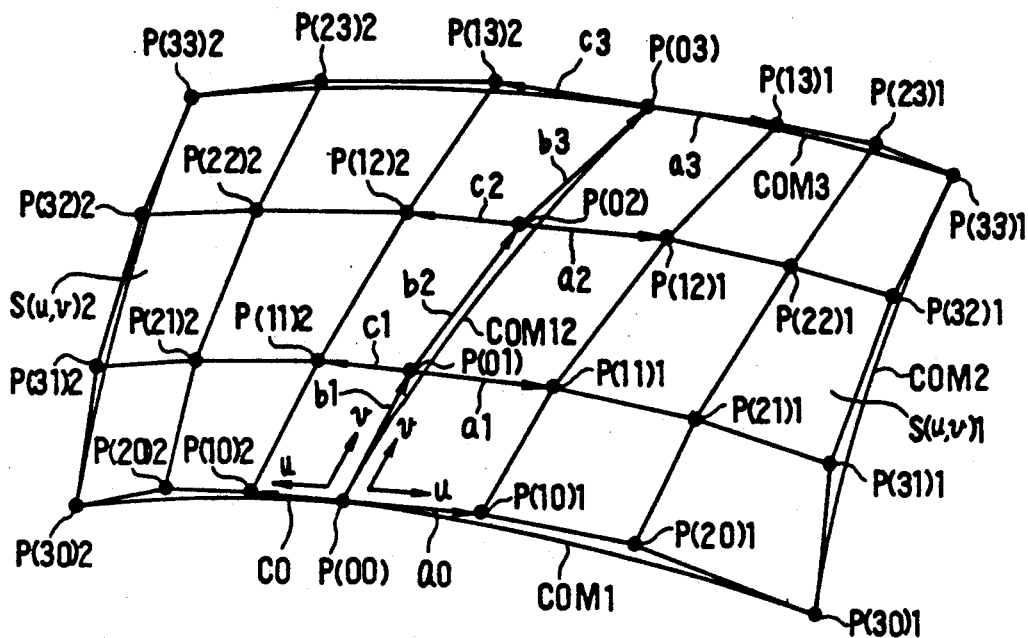
FIG. 1 and FIG. 2 are diagrams illustrating a prior art free curved surface.
Figure 2:
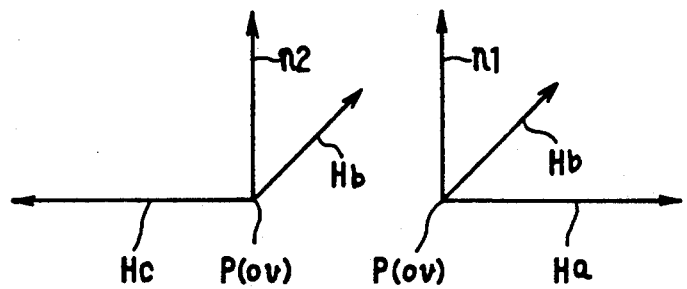
Figure 3:
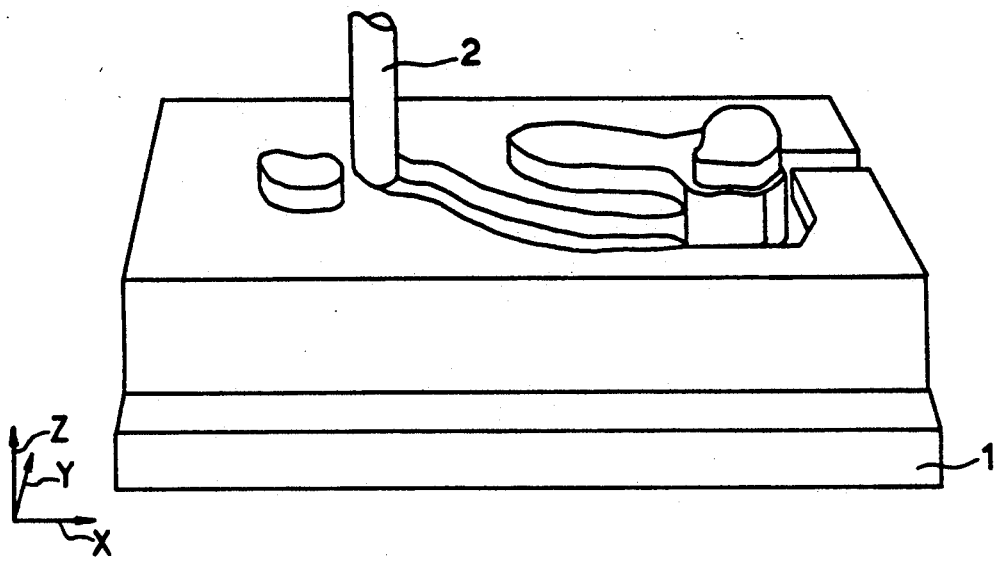
FIG. 3 is a diagram illustrating a prior art contour milling.

In this case, when the start point $ST_1$ is detected from the grid points of the X coordinate value $X_{MIN}$, as shown in FIG. 3i, the CPU sets a point away from the start point $ST_1$ in a negative direction X by the distance $R+\alpha$ as a start point $P_0$ for contour milling, and then shifts to step SP19.

On the other hand, when a start point $CT_5$ is detected from the grid points of the X coordinate value $X_{MAX}$, the CPU sets a point away from the start point $CT_5$ in a positive direction X by the distance $R+\alpha$ as a start point for contour milling, and then shifts to step SP19.

Further, in case a start point $CT_7$ or $CT_3$ is detected from the grid points of the Y coordinate value $Y_{MIN}$ or $Y_{MAX}$, the CPU sets the point away from the start point $CT_3$ to a negative direction Y at a distance $R+\alpha$, or a point away from the start point $CT_7$ in a positive side of the direction Y at a distance $R+\alpha$ as a start point for contour milling, and then shifts to step SP19.

Figure 32:
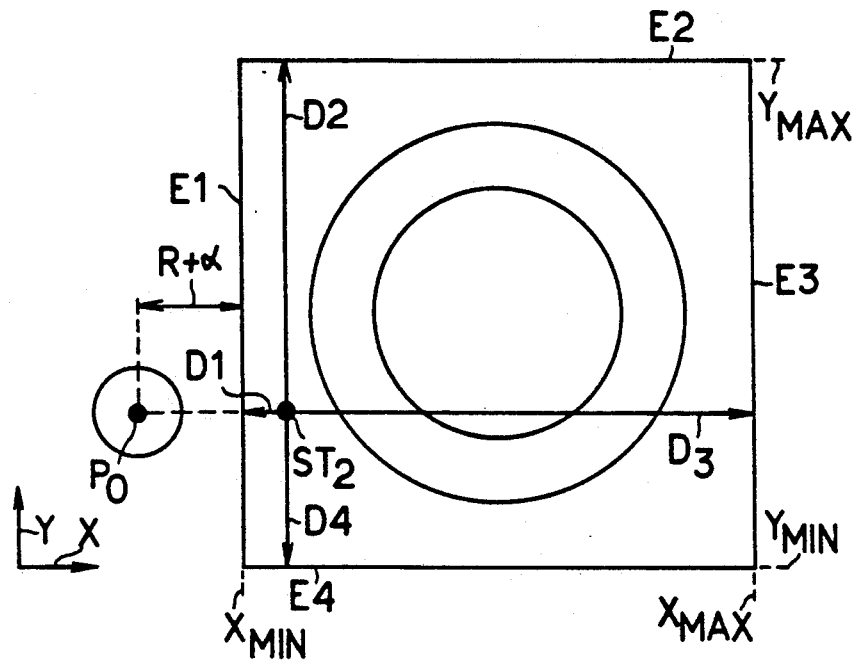
FIG. 32 is a schematic diagram for illustrating the setting of a drilling position.

Meanwhile, in regard to a loop start point $ST_2$ detected from those other than the grid points other than those on the outermost periphery, distances D1, D2, D3, D4 to the outermost periphery of the model are detected, as shown in FIG. 32, for straight lines extending in the directions X and Y from the loop start point $ST_2$.

Further, the auxiliary data is retrieved along each straight line in the order of the shortest distance, and whether or not the cut plane S1 on the straight line extends over the model surface is determined.

Here, when it is determined that the cut plane S1 extends over the model surface, retrieval of the auxiliary data is ended, the start point $P_0$ for contour milling at which the flat end mill is advanced as far as the loop start point $ST_2$ is set on an extension of the straight line (a straight line of the distance D1 being detected in this case) away from an outermost form of the model by the distance $R+\alpha$, and then the CPU shifts to step SP19.

On the other hand, in all the straight lines, when the cut plane S1 comes below the model surface, the CPU decides that the loop start point $ST_2$ is a position necessary for drilling, sets the loop start point $ST_2$ to a drilling point, and then shifts to step SP19.

Thus, for the loop start point $ST_2$, whether or not the flat end mill can be advanced from an outermost periphery of the model can be decided easily according to the auxiliary data with reference to the grid points, and thus the drilling position can be set easily and automatically.

The CPU then retrieves contour points successively with reference to the detected loop start point $ST_1$ ($CT_1$) in step SP19.

Figure 33:
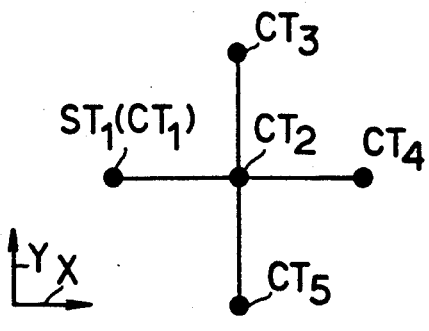
FIG. 33 to FIG. 36 are schematic diagrams for illustrating the retrieval of contour points.

As shown in FIG. 33, the retrieval is a process for detecting successively the adjacent contour points $CT_2$, $CT_3$, $CT_4$, from the loop start point $ST_1$ ($CT_1$), and connecting the contour points in the detected order to generate a tool path beginning from the loop start point $ST_1$.

The contour points, once retrieved, are excluded from the subsequent retrieval, thereby generating tool paths for contour milling.

In this case each contour point comprises a point indicating a contour of the model generated according to a result obtained from comparing the grid point and the cut plane, so that by generating the tool paths by connecting the adjacent contour points, overcutting will effectively be avoided while generating the tool paths for contour milling.

That is, in the cylindrical model as described with reference to FIG. 32, the contour points can be detected in sequence along a sectional form of the model, thus generating a tool path for the outer periphery of the model.

Then in the model as mentioned with reference to FIG. 29, the tool path for the outer periphery of the model can be generated from the loop start point $ST_1$ to a contour point $CT_8$.

Further, if as the contour points are retrieved more than one of the contour points $CT_3$, $CT_4$ not yet retrieved abut more than one on a single contour point $CT_2$ one contour point $CT_3$ or $CT_4$ of them is selected and the ensuing contour points are retrieved, and the contour point $CT_4$ or $CT_3$ not selected is registered as a branch point.

Figure 34:
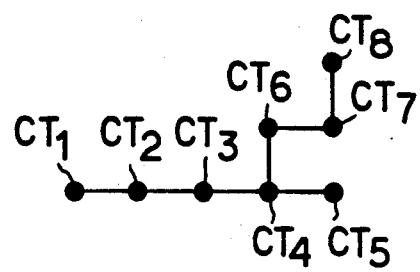

Thus, as shown in FIG. 34, when the contour points $CT_2$, $CT_3$ are retrieved successively from the contour point $CT_1$ side, and the contour points $CT_5$ and $CT_6$ abut on the contour point $CT_4$, the contour points $CT_2$, $CT_3$, $CT_4$, $CT_5$ are retrieved in sequence from the contour point $CT_1$, and then the retrieval is turned back to the contour point $CT_5$, thus generating a tool path in the order of the contour points $CT_5$, $CT_4$, $CT_6$, $CT_7$, $CT_8$.

Here, if the adjacent contour points not yet retrieved cannot be detected, then the CPU shifts to step SP20, and decides whether or not a loop is realized with reference to the loop start point $ST_1$ ($CT_1$) retrieved in step SP19.

Where the contour point $CT_8$, which cannot be finally retrieved, and the loop start point $ST_1$ ($CT_1$) are both grid points on an outermost periphery of the model (FIG. 29), the CPU sets the contour point $CT_8$ to an end point to determined that the loop beginning from the loop start point $ST_1$ is realized, and then shifts to step SP21.

Thus, the contour points continuing from the loop start point $ST_1$ will be retrieved successively to obtain a loop LOOP1, thereby subjecting the model to a contour milling through tool paths of the loop LOOP1.

Further, when the last contour point which cannot be retrieved coincides with loop branch points $BK_1$, $BK_2$ (FIG. 30), the CPU sets the contour point to an end point to decide that loops LOOP2, LOOP5 beginning from the loop start points $P_0$, $ST_3$ are realized, and then shifts to step SP21.

Figure 35:
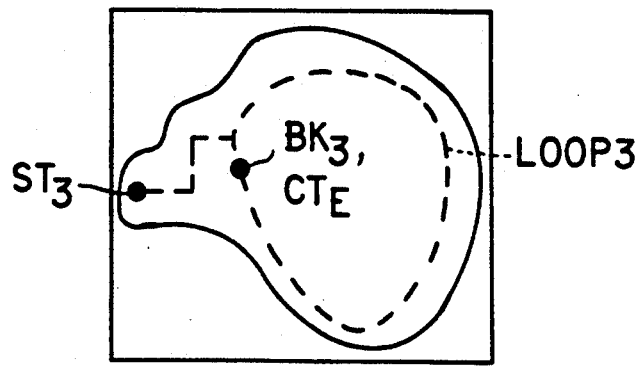

Thus, as shown in FIG. 35, the model is recessed as a whole and partly grooved, and when a flat end mill for rough machining coming into such a grooved portion is not to overcut, a contour point is generated on the grooved portion according to the grid point.

Further, when the contour point on an extreme end of the grooved portion is detected as a start point $ST_3$, contour points are retrieved successively from the start point $ST_3$, and after a branch point $BK_3$ the inside of the model, and thus the contour point not yet registered cannot be detected at the branch point $BK_3$ after all.

Accordingly, the CPU sets the last contour point which cannot be retrieved as an end point in this case, decides that a loop LOOP3 beginning from the loop start point $ST_3$ is realized, and then shifts to step SP21.

Here, the CPU retrieves the contour points not yet registered successively from the remaining branch point as in the case where contour points are retrieved successively from the start point in step SP19.

Figure 36:
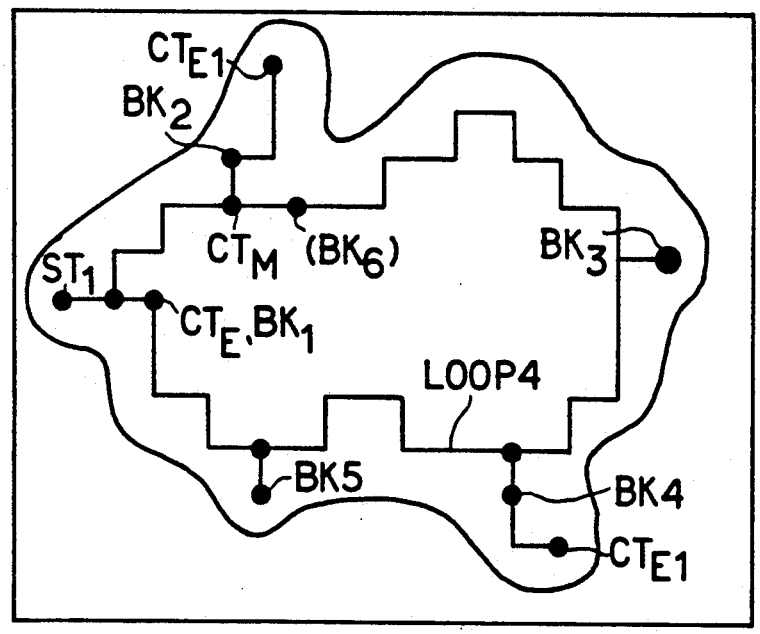

That is, as shown in FIG. 36, there may be a case where retrieval is commenced from the start point $ST_1$, branch points $BK_1$, $BK_2$, $BK_3$, $BK_4$, $BK_5$ are detected successively, and a loop LOOP4 with the branch point $BK_1$ as an end point is realized.

At the branch points $BK_2$, $BK_3$, $BK_4$, $BK_5$ in this case, there are present contour points not yet retrieved which are adjacent to the branch points $BK_2$, $BK_3$, $BK_4$, $BK_5$, and hence a rough machining can proceed in a groove from the branch points $BK_2$, $BK_3$, $BK_4$, $BK_5$.

Accordingly in the embodiment, when the loop LOOP4 is realized from retrieving contour points further from the remaining branch points $BK_2$, $BK_3$, $BK_4$, $BK_5$, a tool path for rough machining will be generated for such grooved portion.

That is, the CPU sets the branch point $BK_2$ as a start point, then retrieves contour points not yet searched from the start point, thus generating tool paths branched from the loop LOOP4 and reaching an end point CTE1.

In this case, when the branch point is detected again, the CPU registers it to similarly process the remaining branch points.

The CPU the shifts to step SP22, determines whether or not contour points are retrieved for all the branch points in the loop LOOP4, and returns to step SP21 if a negative result is obtained in this case.

The CPU repeats the procedure covering steps SP21 - SP22 - SP21 thereby generating tool paths successively for the branch points $BK_2$, $BK_3$, $BK_4$, $BK_5$ of the loop LOOP4.

On the other hand, when the contour points are retrieved completely for all the branch points $BK_2$, $BK_3$, $BK_4$, $BK_5$, an affirmative result is obtained in step SP22, and the CPU shifts to step SP23.

Here the CPU determines whether or not contour points remain unretrieved on the cut plane S1, and if an affirmative result is obtained here, then it returns to step SP18 to set a loop start point for the remaining contour points.

Thus, in the cylindrical model (FIG. 30), from repeating steps SP18 - SP19 - SP20 - SP21 - SP22 -SP23 - SP18, a tool path for the loop LOOP5 is generated consecutively to the loop LOOP2 beginning from the start point $P_0$ for contour milling, and a start point $CT_{10}$ for the loop LOOP5 is set as a drilling point.

Then, in the model described with reference to FIG. 29, loops LOOP1, LOOP6, LOOP7 and LOOP8 beginning from the start point $P_0$ for contour milling are each detected successively, and tool paths for the loops LOOP1, LOOP6, LOOP7, LOOP8 are thus generated.

A negative result is then obtained in step SP23, and the CPU shifts to step SP24 to END the procedure.

On the other hand, in a retrieval of the contour points in step SP19, when, for example, the contour point $CT_{E1}$ side is selected at a contour point $CT_M$ (FIG. 36), and a branch point $BK_6$ is registered, contour points adjacent to the contour point $CT_{E1}$ cannot be detected.

In this case, the contour point $CT_{E1}$ is set as an end point, and both edge and branch points are not coincident, so that in step SP20, the CPU determines that a loop is not realized, and thus shifts to step SP25.

Here the CPU proceeds backward to the path retrieved from the contour point $CT_{E1}$ (called backtrack hereinafter), and decides whether or not it is adjacent to the branch point in step SP26.

Here, if a negative result is obtained, the CPU shifts to step SP27 to determine whether or not the distance backtracked covers 20 or less contour points.

If a negative result is obtained here, the CPU returns to step SP25, backtracks again, and then shifts to step SP26 to determine whether or not the contour point is adjacent to the branch point.

Thus, from repeating the process of steps SP25 - SP26 SP27 - SP25, the CPU backtracks in the range of 20 of contour points to retrieve the branch point.

When a contour point $CT_M$ adjacent to the branch point $BK_6$ in the backtracking range of 20 points is detected, the CPU returns to step SP19 and shifts to the branch point $BK_6$ to retrieve the contour point adjacent thereto.

Further in this case, the CPU generates a tool path as backtracking, then generates a tool path in the order from the contour point $CT_M$ to the branch point $BK_6$, thus shifting the tool once from the contour point $CT_M$ to the contour point $CT_{E1}$, and then shifts backward from the contour point $CT_{E1}$ to the contour point $CT_M$ to generate a tool path running toward the branch point $BK_6$.

Thus in the embodiment, even if a loop cannot be generated at first, a contour milling can properly be effected.

On the other hand, when the contour point $CT_M$ adjacent to the branch point cannot be detected in a backtracking range of 20 points, a negative result is obtained in step SP27, and the CPU shifts to step SP28.

Here the CPU registers the contour point $CT_{E1}$ as an end point, and then skips to the branch point $BK_6$ to retrieve the adjacent contour point.

Thus, after shifting the tool along contour points from the contour point $CT_M$ to the contour point $CT_{E1}$, the CPU suspends the cutting once at the end point $CT_{E1}$, and generates a tool path for the cutting to commence from the branch point $BK_6$.

That is, in a practical contour milling, the tool must be moved in a fine path, in most cases, like a path from the contour point $CT_M$ to the contour point $CT_{E1}$ with reference to the loop LOOP4.

In such a fine path, the moving distance from the contour point $CT_M$ is short in most cases, and if so, then the whole rough machining process can be shortened by carrying out a rough machining after backtracking as compared with the case where the cutting is interrupted by drawing up the flat end mill once.

When the backtracking distance is, however, long, the flat end mill is drawn up to interrupt the cutting, and then be moved at high speed to the position to start the next cutting, thereby shortening the machining hours as a whole.

Accordingly, the branch point is retrieved in the range of 20 points, and a rough machining is carried out after backtracking according to a result obtained through retrieval. Then a shift of the tool can be made according to the length of the path from the contour point $CT_M$ to the contour point $CT_{E1}$, thus shortening the time required for the rough machining.

Thus a tool path for contour milling can be generated at every loop with reference to the cut plane S1, and consecutively the CPU generates the tool path for contour milling for the entire cut plane S1.

That is, the CPU connects the start point and the end point of each loop in the order of detection, thereby generating a tool path for the entire cut plane S1.

Then, in each loop, grid points are generated so as not to cause overcutting with the split points indicating a form of the model as a standard, and the tool path is generated with the grid points as a standard; thus, overcutting can be prevented, and the contour milling is smooth.

Further in this case, since a form of the model is represented by means of the split points, the tool path can be generated with a precision which is adequate in practice and in a short time.

When the tool path for contour milling is generated for the entire cut plane S1, the CPU executes the process of FIG. 27 for the cut planes S2, S3, SE, generates tool paths for contour milling successively for the cut planes S2, S3, SE, and ends the process of step SP16 (FIG. 6).

In the embodiment, a reference point PK formed on the contour point is represented by flagging data of the detected contour points.

(3-3) Generation of machining data

When the tool path for contour milling is generated, the CPU shifts to step SP29, where machining data for one-dimensional machining and contour milling is generated.

Here the CPU generates the machining data, repeating in the order of drilling, contour milling and one-dimensional machining successively for the cut planes S1, S2, S3 and SE in that order.

Figure 37:
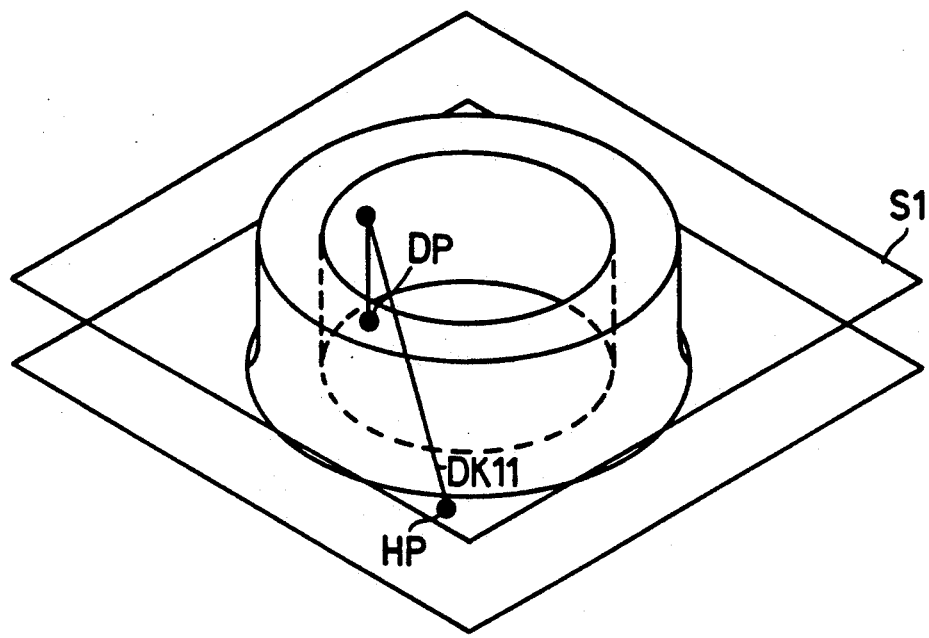
FIG. 37 is a schematic diagram for illustrating a tool path of a drill.

That is, as shown in FIG. 37, where a drilling point DP is set for the cut plane S1 in step SP16, a command to specify a drill of the tool radius R, a Z coordinate value of the cut plane S1, a command for drilling rate and others are added to the coordinate data of the drilling point DP, thereby preparing NC data for drilling.

Thus, after installing a drill of the tool radius at a predetermined reference position HP according to the NC data, the drill is shifted along a tool path DK11 to drill the drilling point DP as deep as the cut plane S1.

The CPU then adds a command to specify a flat end mill of the tool radius A, a coordinate value of the cut plane S1, a command for a drilling rate and others to the coordinate data of the contour milling tool path detected with reference to the cut plane S1 in step SP16, thus generating the NC data for contour milling.

Figure 38:
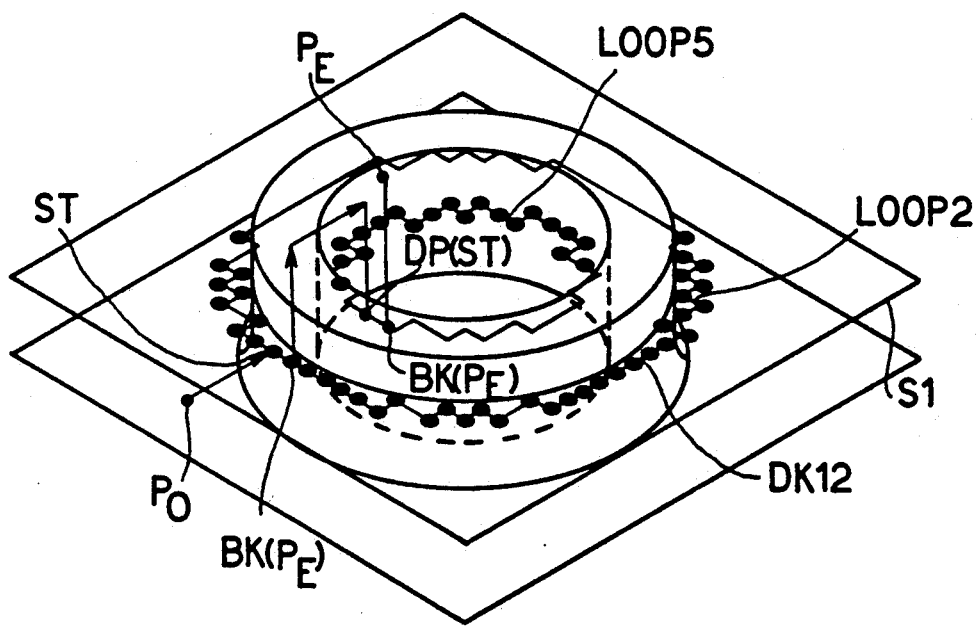
FIG. 38 is a schematic diagram for illustrating a tool path for contour milling.

As shown in FIG. 38, the flat end mill can be shifted along a tool path DK12 according to the NC data, and after milling from the entire start point $P_0$ of the cut plane S1 to a start point ST of the loop LOOP2, the loops LOOP2 and LOOP5 are subjected to milling along a contour of the model.

In the CPU in this case, the flat end mill is drawn up from an end point PE of the loop LOOP2 to a home position and then shifted over a start point of the loop LOOP5. Meanwhile, a command of the NC data is changed so as to change the moving rate of the flat end mill, thus shortening the rough machining hours time.

Figure 39:
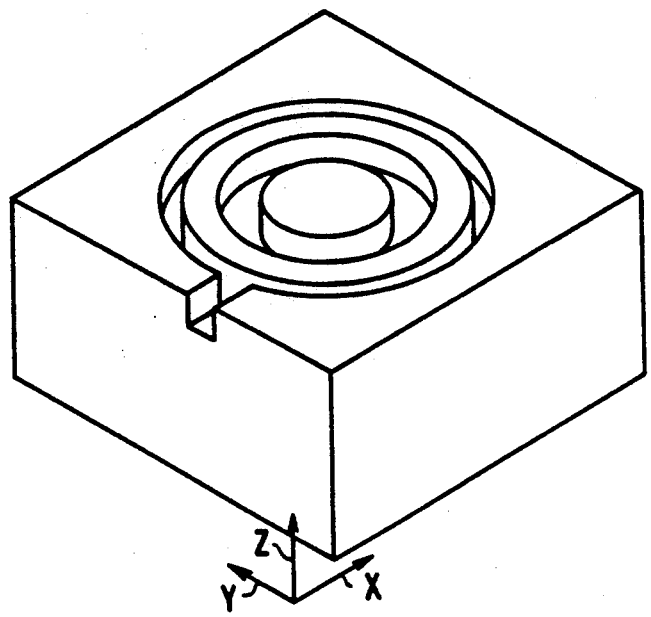
FIG. 39 is a perspective view showing a contour milling result.

Thus, as shown in FIG. 39, a contour milling is realized on a predetermined metallic mold in an outline form of the model according to the NC data.

The CPU then generates the NC data according to the one-dimensional machining tool path detected in step SP15.

That is, as in the case of contour milling, the CPU adds a command to specify a flat end mill of the tool radius R, a Z coordinate value $Z_{MAX}$ of the model, a command for cutting rate and others to the coordinate data of the one-dimensional machining tool path, thereby generating the NC data.

Figure 40:
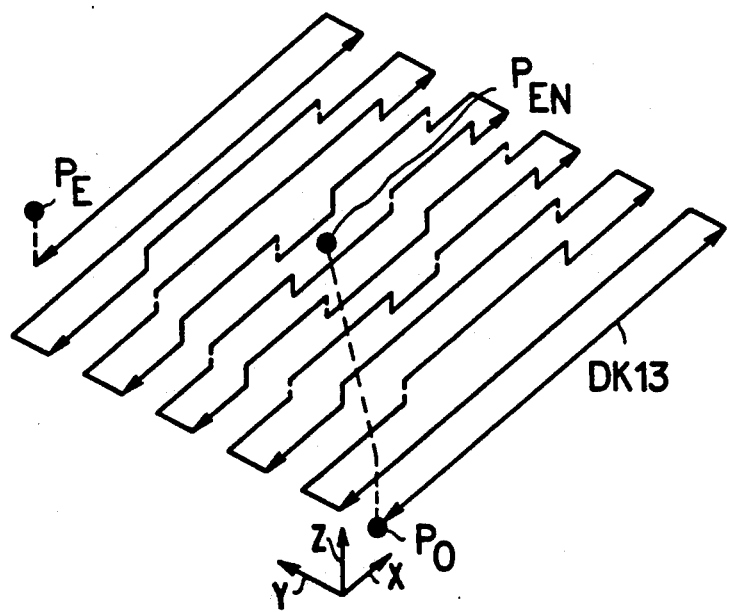
FIG. 40 is a diagram showing a tool path for one-dimensional machining.

Thus, as shown in FIG. 40, the flat end mill can be shifted along a tool path DK13, and as Y coordinate values successively change stepwise, excess metal can be removed in the direction X.

In this case, the CPU sets a Z coordinate value of the flat end mill for cutting an uppermost surface of the model, cuts the uppermost surface of the model simultaneously with the cut plane S1, and thus shortens the machining hours accordingly.

Further, when the end mill is shifted upward and also shifted from the end point for contour milling to the start point $P_0$ for the one-dimensional machining (comprising a path indicated by a broken line), the command for the moving rate is changed for the flat end mill to shift at high speed, thereby shortening the rough machining time.

Thus, the surface extending upward from the cut plane S1 can be subjected to rough machining according to the NC data generated for drilling, contour milling and one-dimensional cutting.

Similarly, the CPU successively generates the NC data for drilling, contour milling, one-dimensional machining with reference to the cut planes S2, S3, SE, thereby generating rough machining data.

In this case, while the uppermost surface of the model is subjected to cutting concurrently with the one-dimensional cutting of the cut plane S1, the CPU draws up the flat end mill to a home position to shift at high speed in the one-dimensional machining of the cut planes S2, S3, SE, thereby shortening the entire machining process.

On the other hand, where the drilling point has not been detected in step SP16, the NC data for contour milling and one-dimensional machining is generated in the order of the cut planes instead of the N data for drilling.

C

Figure 41:
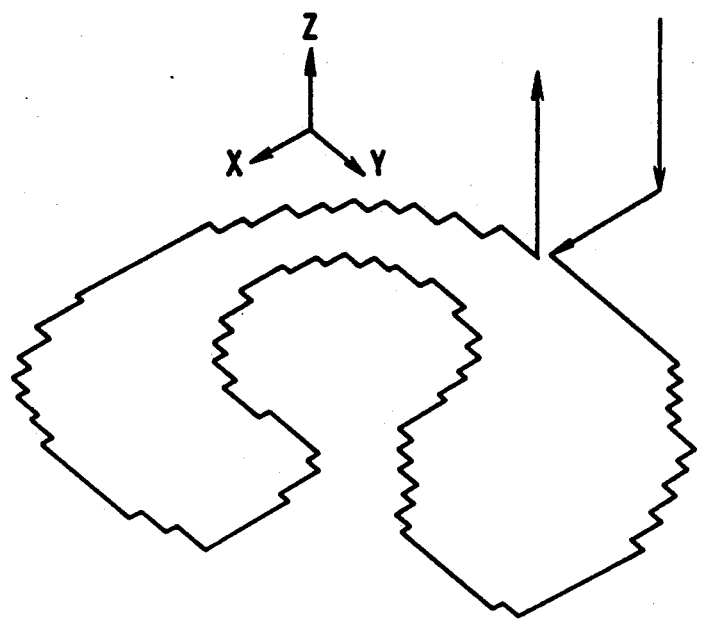
FIG. 41 is a diagram showing a tool path for contour milling according to another model.
Figure 42:
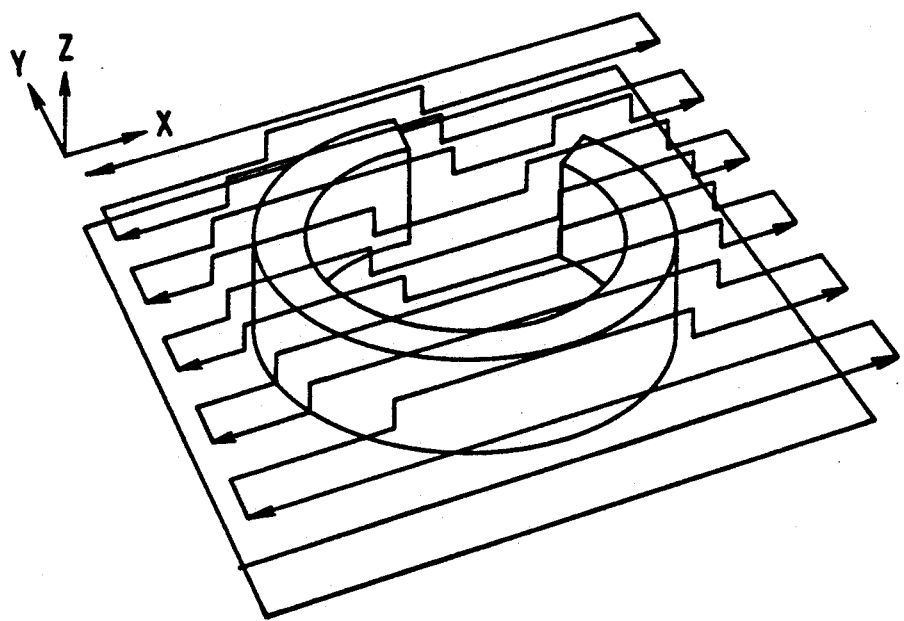
FIG. 42 is a diagram showing a tool path for one-dimensional machining thereof.

Thus, in the model described hereinabove with reference to FIG. 29, NC data for shifting the flat mill through a path shown in FIG. 41 and FIG. 42 is generated for each cut plane, thus carrying out drilling automatically as the occasion demands.

Figure 4:
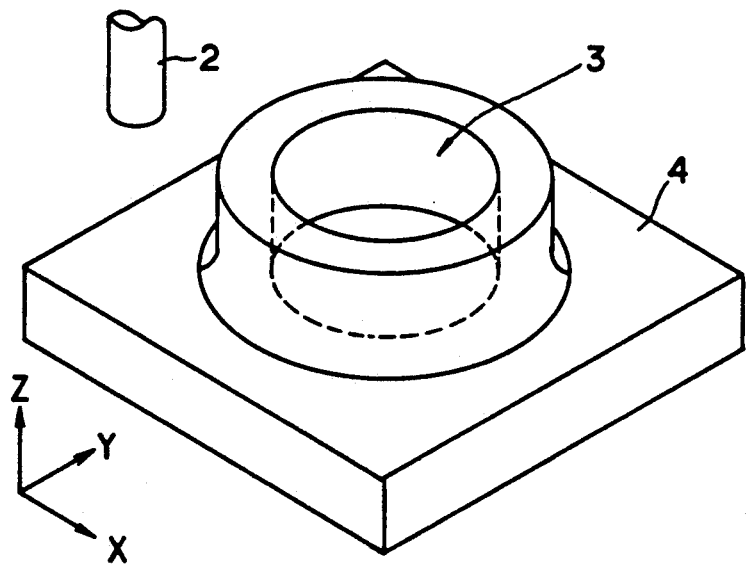
FIG. 4 is a diagram illustrating a prior art pocket portion.

When the machining data $DT_{CL}$ is generated completely, the CPU shifts to step SP30 to end the procedure, and then stores the machining data in the floppy disk 15 (FIG. 4) in accordance with the operation by the operators.

Thus in the NC milling machine 14, the metallic mold can be subjected to rough machining according to the machining data $DT_{CL}$, and hence the metallic mold of a product represented by a form data $DT_S$ can now be finished in a few short machining hours.

(4) Advantage of the embodiment

According to the aforementioned construction, a gridiron of grid points according to a tool radius is generated from a plurality of split points indicating the form of the model, rough machining data for contour milling is generated from comparing the grid points and coordinate value of the cut plane, and thus overcutting is avoided to effectively obtain the rough machining data for contour milling.

In this case, contour points indicating a sectional contour of the model are generated by comparing the grid point and the coordinate value of the cut plane, and one of the contour points not used for cutting from around the model is set as a drilling position, so that the drilling position can be set automatically, and rough machining data for contour milling can be generated simply.

Further in this case, by generating a tool path in such a manner as will connect adjacent contour points successively, machining data for contour milling can be generated simply.

(5) Other embodiments (5-1) In the aforementioned embodiment, the description has referred to the case where a maximum distance $R_K$ of the split points is set to $\frac{1}{4}$ of the tool radius R, however, the invention is not necessarily limited thereto, and hence it may be set, for example, to $\frac{1}{2}$ of the tool radius R.

In this case, the correction value $\Delta R$ of Eq. (12) may be set to a value obtained as:

$$\Delta R = \sqrt{R^2 - \left(\frac{R}{2*2}\right)^2} \quad (17)$$

(5-2) Further in the aforementioned embodiment, the description has referred to the case where a loop start point is set for the contour points on an outermost periphery of a model, and then the contour point with the minimum Y coordinate value is set as the loop start point from among the contour points with the X coordinate value being a minimum value; again, however, the invention is not necessarily limited thereto, and a process for detecting the loop start point on the outermost periphery of the model may be omitted.

Figure 43:
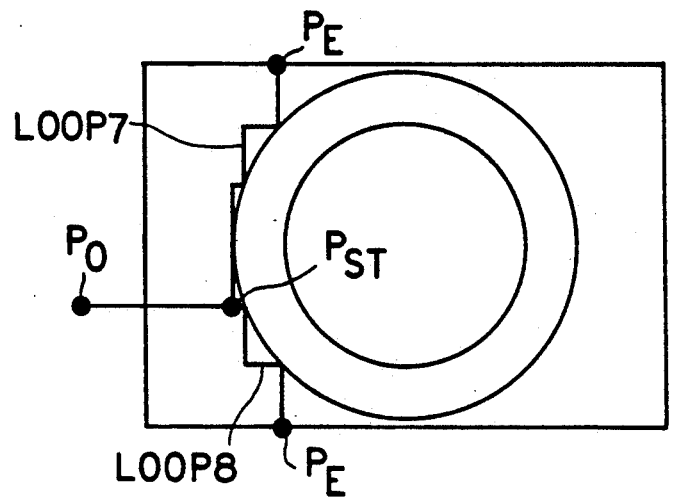
FIG. 43 and FIG. 44 are diagrams representing other embodiments.

In this case, for example, in the cylindrical model shown in FIG. 43, the left side surface may be subjected to a rough machining by the two loops LOOP7 and LOOP8.

Figure 44:
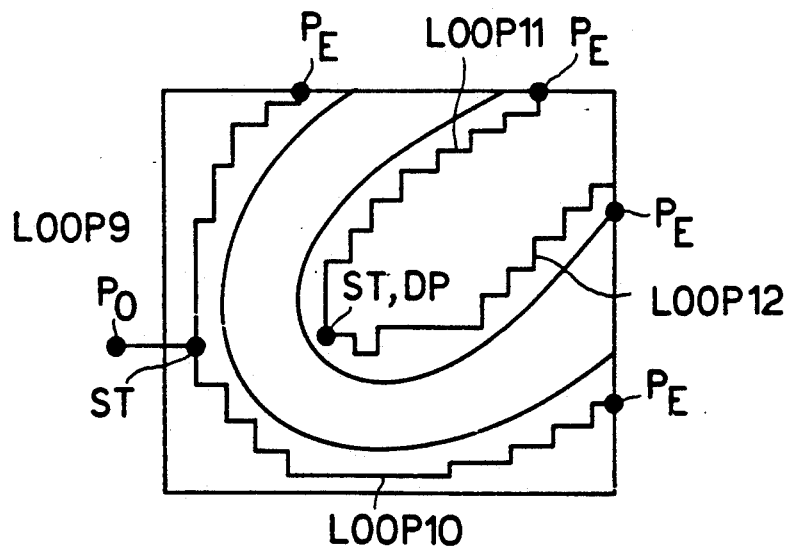

Then, in the model shown in FIG. 44, the outside surface may be subjected to a rough machining by two loops LOOP9 and LOOP10, and the inside surface may be subjected to a rough machining by two loops LOOP11 and LOOP12 after drilling at the drilling point DP.

Further in this case, the cutting order of the loops LOOP7 and LOOP8, and the loops LOOP9 and LOOP10 may be reversed so as to shorten the moving distance of the tool.

(5-3) Further, in the aforementioned embodiment, the description has referred to the case where the contour point with the Y coordinate value at a the contour points with the X coordinate value at a minimum value, but again, the invention is not necessarily limited thereto, and hence, for example, the contour point with the X coordinate value at a minimum value may be set as a loop start point, as occasion demands, from among the contour points with the Y coordinate value at a minimum value.

(5-4) Further, in the aforementioned embodiment, the description has referred to the case where the model uppermost surface is cut concurrently with a one-dimensional machining of the cut plane S1; however, the invention is not necessarily limited thereto, and hence the model uppermost surface may be cut articularly.

(5-5) Further in the aforementioned embodiment, the description has referred to the case where a one-dimensional machining is applied in the direction X, but, the invention is not necessarily limited thereto, and the one-dimensional machining may be applied in the direction Y as the occasion demands.

(5-6) Further in the aforementioned embodiment, the description has referred to the case where, a rough machining is applied on a flat end mill; however, the invention is not necessarily limited thereto, and hence is applied extensively to the case where, for example, a ball end mill is used therefor.

(5-7) Further in the aforementioned embodiment, the description has referred to the case where a model with a free curved surface given by a cubic Bezier expression is subjected to a rough machining; again, however, the invention is not necessarily limited thereto, and hence may be applied extensively to the case where a model with free curved surface given by Coons expression, Ferguson expression or others is subjected to a rough machining, and further to the case where not only a model with a free curved surface but also a model indicated by various form data are subjected to a rough machining.

In the invention in this case, since the form of the model is represented by split points, rough machining data can be generated easily and securely even when each patch is not connected smoothly.

(5-8) Still further, in the aforementioned embodiment, the description has referred to the case where a metallic mold is subjected to rough machining, but, the invention is not necessarily limited thereto, and hence is applicable extensively to the case where, for example, a prototype is subjected to rough machining.

While there have been described certain preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method for generating data defining a machining depth along a tool path for a numerically controlled machine of a type having a machining tool of a known configuration including a mill for contour milling and a drill, using form data defining a three-dimensionally curved surface, comprising the steps of:

selecting a plurality of split points which indicate roughly a three-dimensionally curved surface according to the form data; selecting a plurality of grid points which are evenly spaced in the horizontal direction at a predetermined pitch so as to form a rectilinear grid;

calculating depth data for each of the split points which indicates the height of the three-dimensionally curved surface in a circular region surrounding each split point having a radius equal to the radius of the mill to prevent an overcutting in a depth direction; and generating rough machining data for contour milling by comparing the depth data of the plurality of split points and predetermined depth values of a plurality of cut planes.

2. A method for generating data defining the machining depth along a tool path according to claim 1, wherein the step of generating the rough machining data further comprises selecting a plurality of contour points which indicate a contour obtained from cutting the three-dimensionally curved surface by cross-sectional cut planes, and further comprising the step of forming a path for the machining tool by sequentially retrieving the plurality of contour points.

3. A method for generating data defining the machining depth along a tool path according to claim 2, further comprising the steps of:

detecting a first set of the plurality of contour points on a periphery of a machining target for contour milling;

detecting a second set of the plurality of contour points not on the periphery of the machining target; and selecting a contour point from the second set of the plurality of contour points as a start point for drilling.

4. A method for generating data defining the machining depth along a tool path according to claim 2, wherein the step of forming a path for the machining tool further comprises the steps of:

retrieving a first contour point;

retrieving the remaining contour points by sequentially retrieving a contour point which is adjacent to the last retrieved contour point; and forming a moving path for the machining tool by connecting the contour points in the order in which they are retrieved.

5. A method for rough machining a workpiece of material into a desired shape with a numerically controlled machine tool having a mill for contour milling and a drill, using form data defining a three-dimensional curved surface, comprising the steps of:

selecting a plurality of split points which indicate roughly a three-dimensional curved surface according to the form data;

selecting a plurality of grid points which are evenly spaced in the horizontal direction at a predetermined pitch so as to form a rectilinear grid;

calculating depth data for each of the split points which indicates the height of the three-dimensionally curved surface in a circular region surrounding each split point having a radius equal to the radius of the mill to prevent an overcutting in a depth direction;

generating rough machining data for contour milling by comparing the depth data of the plurality of split points and predetermined depth values of a plurality of cut planes; and contour milling the workpiece in accordance with the rough machining data.

6. A method for rough machining according to claim 5, wherein the step of generating the rough machining data further comprises selecting a plurality of contour points which indicate a contour obtained from cutting the three-dimensionally curved surface by cross-sectional cut planes, and further comprising the step of forming a path for the machine tool by sequentially retrieving the plurality of contour points.

7. A method for rough machining according to claim 6, further comprising the steps of:

detecting a first set of the plurality of contour points on a periphery of the machining target for contour milling;

detecting a second set of the plurality of contour points not on the periphery of a machining target;

selecting a contour point from the second set of the plurality of contour points as a start point for drilling; and drilling a hole in the workpiece at the location of the selected contour point which is large enough for insertion of the mill.

8. A method for rough machining according to claim 6, wherein the step of forming a path for the machine tool further comprises the steps of:

retrieving a first contour point;

retrieving the remaining contour points by sequentially retrieving a contour point which is adjacent to the last retrieved contour point; and forming a moving path for the machining tool by connecting the contour points in the order in which they are retrieved.

* * * * *